(12) United States Patent
Eldar et al.

(10) Patent No.: US 12,118,396 B2
(45) Date of Patent: Oct. 15, 2024

(54) COMPUTING RESOURCE AUTOSCALING BASED ON PREDICTED METRIC BEHAVIOR

(71) Applicant: Microsoft Technology Licensing, LLC, Redmond, WA (US)

(72) Inventors: Adi Eldar, Kiryat-Ono (IL); Shahar Davidovich, Ramat Gan (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 671 days.

(21) Appl. No.: 17/317,571

(22) Filed: May 11, 2021

(65) Prior Publication Data

US 2022/0374273 A1 Nov. 24, 2022

(51) Int. Cl.
*G06F 9/50* (2006.01)
*G06F 16/2458* (2019.01)
*G06F 16/25* (2019.01)

(52) U.S. Cl.
CPC ........ *G06F 9/5027* (2013.01); *G06F 16/2465* (2019.01); *G06F 16/254* (2019.01)

(58) Field of Classification Search
None
See application file for complete search history.

(56) References Cited

U.S. PATENT DOCUMENTS

| 8,499,066 | B1 * | 7/2013 | Zhang | H04L 47/83 709/200 |
| 2017/0329660 | A1 * | 11/2017 | Salunke | G06F 11/3409 |
| 2018/0241812 | A1 * | 8/2018 | Marchetti | H04L 67/1023 |
| 2019/0130293 | A1 * | 5/2019 | Singh | G06F 17/18 |
| 2019/0317817 | A1 * | 10/2019 | Brown | G06F 9/5077 |
| 2019/0317829 | A1 * | 10/2019 | Brown | G06F 9/5077 |

(Continued)

OTHER PUBLICATIONS

Iqbal, Waheed, Josep Lluis Berral, Abdelkarim Erradi, and David Carrera. "Adaptive prediction models for data center resources utilization estimation." IEEE Transactions on Network and Service Management 16, No. 4 (2019): 1681-1693. (Year: 2019).*

(Continued)

*Primary Examiner* — Frank D Mills
(74) *Attorney, Agent, or Firm* — Newport IP, LLC; Jacob P. Rohwer

(57) ABSTRACT

Methods, systems, apparatuses, and computer-readable storage mediums described herein are configured to automatically allocate or deallocate computing resources based on a prediction of performance metrics behavior. For instance, the historical behavior of compute metrics (or a time series obtained therefor) is analyzed to detect a seasonality (i.e., a seasonal pattern) and a trend therefor. A prediction of the metrics' behavior for a future time frame is determined based on the seasonality and the trend. Based on the prediction, computing resources are allocated or deallocated at or prior to the future time frame occurring. For example, if a prediction is made that a particular metric will increase, additional compute resources are allocated to handle the increase ahead of the predicted metric increase. If a prediction is made that a particular metric will decrease, compute resources are deallocated at the time the metric is predicted to decrease.

16 Claims, 10 Drawing Sheets

(56) References Cited

U.S. PATENT DOCUMENTS

2020/0125988 A1* 4/2020 Garvey .................. G06Q 10/04
2022/0253784 A1* 8/2022 Mullinjer ............... G06Q 10/04

OTHER PUBLICATIONS

Davidovich, Shahar, "How to save ADX cost with the new Predictive Autoscale", Retrieved from: https://techcommunity.microsoft.com/t5/azure-data-explorer/how-to-save-adx-cost-with-the-new-predictive-autoscale/ba-p/2113234, Feb. 9, 2021, 12 Pages.

* cited by examiner

COMPUTING RESOURCE AUTOSCALING BASED ON PREDICTED METRIC BEHAVIOR

BACKGROUND

The challenge of allocating computing resources is well known for cloud services. Some solutions set manual scheduling rules. A manual scheduling rule may specify, for example, that a certain number of computing resources are allocated at predetermined times (e.g., every day between 8 am to 5 pm). Other solutions perform reactive autoscaling, where resource allocation is triggered based on detecting an increase in resource consumption, and resource deallocation is triggered based on detecting a decrease in resource consumption. Manual scheduling rules are not adaptive to real life scenarios and are difficult to tune and maintain. Reactive models have an inherent delay. For instance, suppose a reactive model specifies a rule that additional compute resources should be allocated if the average central processing unit (CPU) consumption is above 90% in the last hour. This rule will not be effective in the event that there are significant load changes for relatively short durations. The total time it takes for a reactive model to perform the scale operation might be longer than the high load window. In such a case, the reactive model will fail to mitigate the load.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums described herein are configured to automatically allocate or deallocate computing resources based on a prediction of metric behavior. For instance, the historical behavior of compute metrics (or a time series obtained therefor) is analyzed to detect a seasonality (i.e., a seasonal pattern) and a trend therefor. A prediction of the metrics' behavior for a future time frame is determined based on the seasonality and the trend. Based on the prediction, computing resources are allocated or deallocated in an optimized way during the future time frame occurring. For example, if a prediction is made that a particular metric will exceed a predetermined upper threshold, additional compute resources are allocated ahead of the predicted metric exceeding the predetermined upper threshold. If a prediction is made that a particular metric will drop below a predetermined lower threshold, compute resources are deallocated at the time the metric is predicted to drop below the predetermined lower threshold.

Further features and advantages, as well as the structure and operation of various example embodiments, are described in detail below with reference to the accompanying drawings. It is noted that the example implementations are not limited to the specific embodiments described herein. Such example embodiments are presented herein for illustrative purposes only. Additional implementations will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate example embodiments of the present application and, together with the description, further serve to explain the principles of the example embodiments and to enable a person skilled in the pertinent art to make and use the example embodiments.

Figure 1:
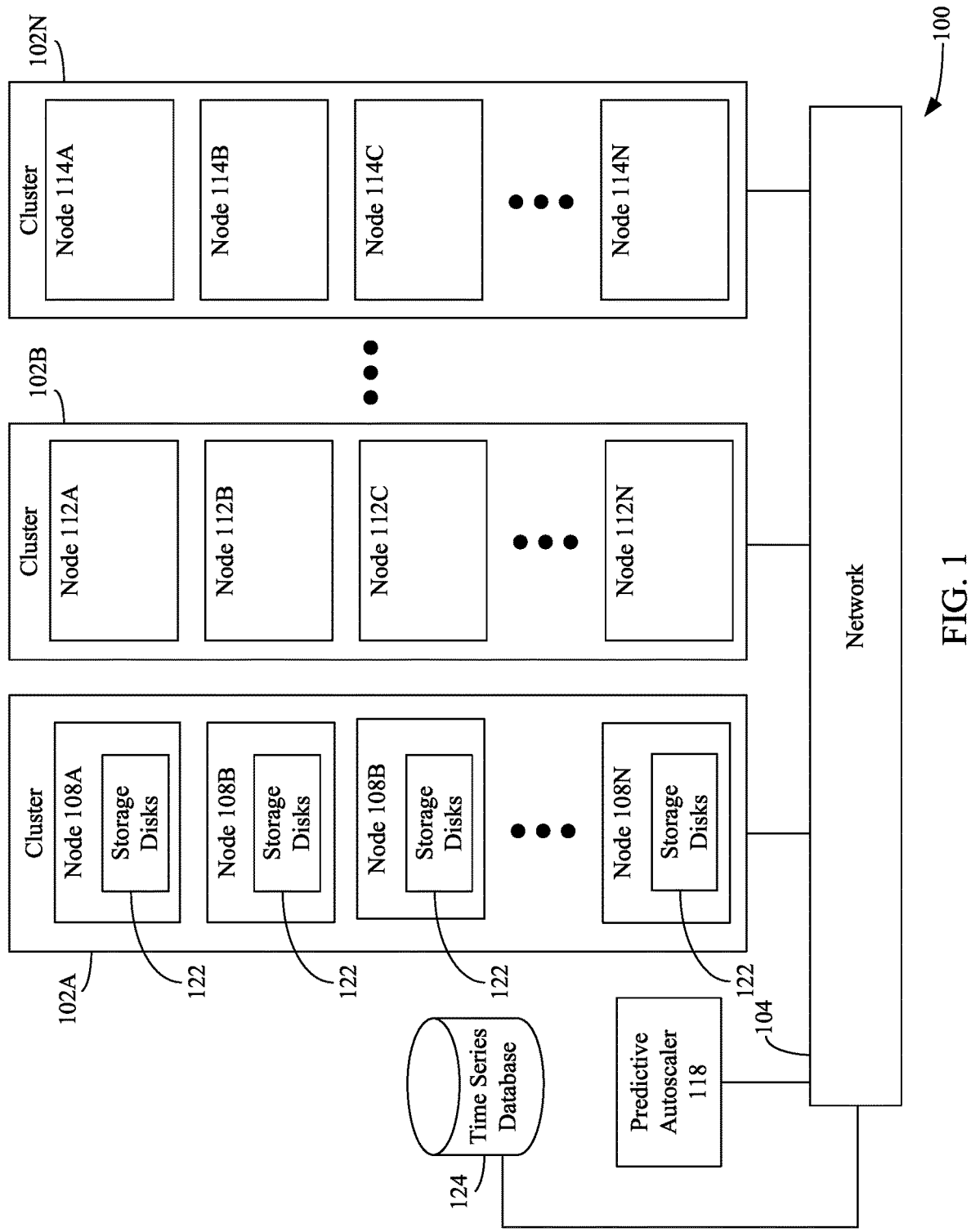
FIG. 1 depicts a block diagram of an example network-based computing system configured to allocate or deallocate resources based on a prediction of metric behavior in accordance with an example embodiment.

The features and advantages of the implementations described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose numerous example implementations. The scope of the present application is not limited to the disclosed implementations, but also encompasses combinations of the disclosed implementations, as well as modifications to the disclosed implementations. References in the specification to "one implementation," "an implementation," "an example embodiment," "example implementation," or the like, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of persons skilled in the relevant art(s) to implement such feature, structure, or characteristic in connection with other implementations whether or not explicitly described.

In the discussion, unless otherwise stated, adjectives such as "substantially" and "about" modifying a condition or relationship characteristic of a feature or features of an implementation of the disclosure, should be understood to mean that the condition or characteristic is defined to within tolerances that are acceptable for operation of the implementation for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous example embodiments are described as follows. It is noted that any section/subsection headings provided herein are not intended to be limiting. Implementations are described throughout this document, and any type of implementation may be included under any section/subsection. Furthermore, implementations disclosed in any section/subsection may be combined with any other implementations described in the same section/subsection and/or a different section/subsection in any manner.

II. Example Implementations

Embodiments described herein are directed to automatically allocating or deallocating computing resources based on a prediction of metric behavior. For instance, the historical behavior of compute metrics (or a time series obtained therefor) is analyzed to detect a seasonality (i.e., a seasonal pattern) and a trend therefor. A prediction of the metrics' behavior for a future time frame is determined based on the seasonality and the trend. Based on the prediction, computing resources are allocated or deallocated in optimized way during the future time frame. For example, if a prediction is made that a particular metric will exceed a predetermined upper threshold, additional compute resources will be allocated to handle the increase ahead of time. If a prediction is made that a particular metric will be below a predetermined lower threshold, compute resources will be deallocated at the time the metric is predicted to be below the predetermined lower threshold.

The embodiments described herein improve the functioning of the computing devices for which the metrics are being obtained. For instance, certain conventional techniques allocate resources reactively, where resources are either allocated or deallocated only after detecting an increase or decrease, respectively, of a compute metric. This may have a detrimental effect on the computing device. For instance, the computing device may be suffering from abnormal memory usage and/or network usage, which would go unresolved until after additional computing devices are allocated. Accordingly, the computing device may operate much more slowly and/or may be unable to properly handle requests. In contrast, because the embodiments described herein allocate resources proactively based on a predicted behavior of the metrics, the computing device will no longer suffer from such detrimental effects, as additional allocated resources are allocated before the actual metric increase. Moreover, the power consumed, for example, by a datacenter, that houses such computing devices is lowered via the deallocation techniques described herein, as the number of compute resources executing is reduced during times when the metric is decreased.

Moreover, in an embodiment in which the techniques described herein are implemented in a cloud computing network in which customers pay for compute resources, the techniques described herein advantageously reduce the cost to the customer by ensuring only a required amount of computing resources are allocated at any given point in time, while at the same time improving the performance at peak load times.

For example, FIG. 1 shows a block diagram of an example network-based computing system 100 configured to allocate or deallocate resources based on a prediction of metric behavior, according to an example embodiment. As shown in FIG. 1, system 100 includes a plurality of clusters 102A, 102B and 102N, a predictive autoscaler 118, and a time series database 124 communicatively coupled via a network 104. Network 104 may comprise one or more networks such as local area networks (LANs), wide area networks (WANs), enterprise networks, the Internet, etc., and may include one or more of wired and/or wireless portions.

Clusters 102A, 102B and 102N may form a network-accessible server set. Each of clusters 102A, 102B and 102N may comprise a group of one or more nodes. For example, as shown in FIG. 1, cluster 102A includes nodes 108A-108N, cluster 102B includes nodes 112A-112N, and cluster 102N includes nodes 114A-114N. Each of nodes 108A-108N, 112A-112N and/or 114A-114N are accessible via network 104 (e.g., in a "cloud-based" embodiment, such as a cloud computing network) to build, deploy, and manage applications and services. Each of node(s) 108A-108N, 112A-112N and/or 114A-114N may comprise a plurality of physical storage disks 122 that is accessible via network 104 and is configured to store data associated with the applications and services managed by nodes 108A-108N, 112A-112N, and/or 114A-114N. Examples of physical storage disks 122 include, but are not limited to, hard disk drives, solid state drives, etc. It is noted that storage disks 122 are not shown in FIG. 1 as being included in nodes 112A-112N and nodes 114A-114N for the sake of brevity.

In an embodiment, one or more of clusters 102A, 102B and 102N may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 102A, 102B and 102N may be a datacenter in a distributed collection of datacenters.

Each of node(s) 108A-108N, 112A-112N and 114A-114N may be configured to execute one or more software applications (or "applications") and/or services and/or manage hardware resources (e.g., processors, memory, etc.), which may be utilized by users (e.g., customers) of the network-accessible server set. Node(s) 108A-108N, 112A-112N and 114A-114N may also be configured for specific uses. In certain embodiments, each of clusters 102A, 102B, and 102N may represent a group of compute resources (e.g., nodes, storage disks, etc.) that have been allocated for a respective customer for implementing a particular one or more applications or services.

Predictive autoscaler 118 may be configured to automatically allocate or deallocate compute resources maintained by system 100 for any given cluster of clusters 102A-102N based on a prediction (or forecast) of the usage of such compute resources. Predictive autoscaler 118 may be executed on a centralized node that is communicatively coupled to each of cluster of clusters 102A-102N via network 104. For instance, a monitor may obtain metrics associated with resources, such as, but not limited to, operating systems, applications, services executing on one or more of nodes 108A-108N, 112A-112N and/or 114A-114N, hardware and virtual resources maintained by the network-accessible server set (e.g., nodes 108A-108N, 112A-112N and/or 114A-114N, virtual machines (VMs), central processor units (CPUs), storage (e.g., storage disks 122), memories, etc.), and/or I/O network bandwidth, power, etc., associated therewith. Additional details regarding the functionality of the monitor are provided below with reference to monitor 202 of FIG. 2. The metrics may represent numerical data values that describe an aspect of such resources at a particular point of time. For example, the metrics may represent CPU usage, a number of requests issued by a particular application or service, memory or storage utilization, etc. Such metrics may be collected at regular intervals (e.g., each second, each minute, each hour, each day, etc.) and may be aggregated as a time series (i.e., a series of data points indexed in time order). The monitor may collect multiple days or weeks of worth data to obtain the historical behavior of the metric. The time series for each metric may be stored in time series database 124, such as storage disks 122.

Predictive autoscaler 118 may analyze the historical behavior of the metric (i.e., the time series) to determine a seasonal pattern (i.e., a seasonality) therein and a trend thereof. A seasonal pattern is a characteristic of the time series in which the data experiences regular or predictable changes that occur at particular constant time interval, such as hourly, daily, weekly, etc. Examples of seasonal patterns include, but are not limited to, increased network traffic on weekdays than compared to weekends, increased network traffic during business hours than compared to non-business hours, a daily spike in CPU and/or storage utilization (e.g., due to a backup process), etc. A trend is a characteristic of the time series that represents a long-term increase or decrease (e.g., CPU usage increases or decreases over time). Additional details regarding determining a seasonal pattern and a trend is described below with reference to FIG. 2.

Predictive autoscaler 118 generates a prediction of the metric's behavior for a future time frame based on the determined seasonal pattern and trend. Based on the prediction, predictive autoscaler 118 may allocate or deallocate computing resources prior to the future time frame occurring. For example, if a prediction is made that the metric will increase, predictive autoscaler 118 may initiate a scale out operation to allocate additional compute resources (e.g., compute nodes 108A-108N, storage disks 122, etc.) ahead of the predicted metric increase to handle the increase in the metric. This ensures that the increase in the metric is properly served with the necessary amount of compute resources. In another example, if a prediction is made that the metric will decrease, predictive autoscaler 118 may initiate a scale in operation to deallocate certain compute resources at (or before) the time the metric is predicted to decrease, thereby saving significant cost while keeping adequate performance.

It is noted that while predictive autoscaler 118 is described as being implemented as a centralized component that serves multiple clusters (e.g., clusters 102A-102N), the embodiments described herein are not so limited. For example, each cluster of clusters 102A-102N may be associated with a respective predictive autoscaler 118 (e.g., executing on a respective node thereof). Predictive autoscaler 118 may also be implemented in an on-premise environment or as a third-party service.

Figure 2:
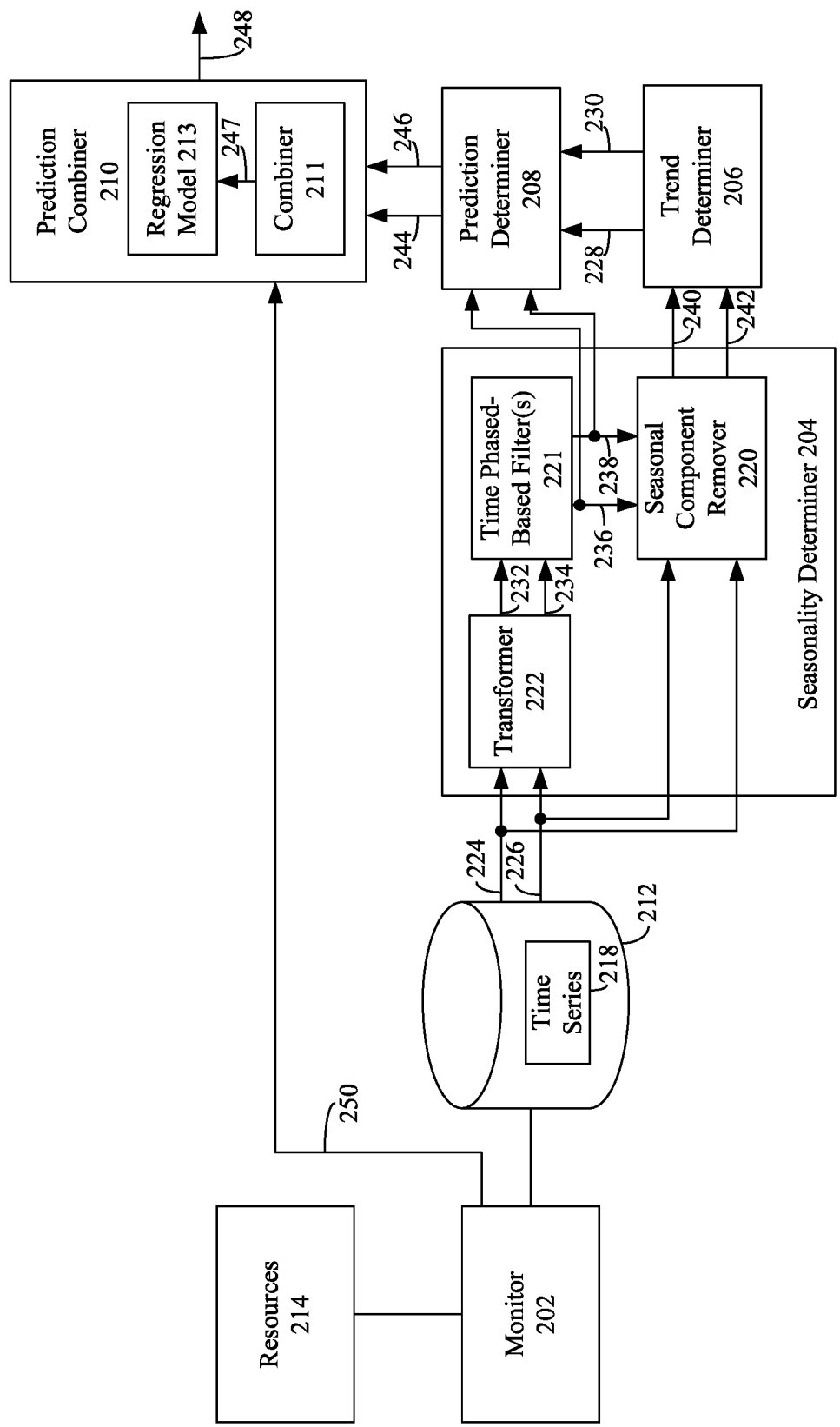
FIG. 2 is a block diagram of a system for generating a prediction based on a seasonal pattern and a trend in at least one time series for at least one particular metric in accordance with an embodiment.

FIG. 2 is a block diagram of a system 200 for generating a prediction based on a seasonal pattern and a trend in at least one time series for at least one particular metric in accordance with an embodiment. For example, as shown in FIG. 2, system 200 includes a monitor 202, a seasonality determiner 204, a trend determiner 206, a prediction determiner 208, a prediction combiner 210, a time series database 212, and resources 214. Seasonality determiner 204 includes a seasonal component remover 220, one or more time phased-based filters 221 and a transformer 222. Each of monitor 202, time series database 212 seasonality determiner 204, trend determiner 206, prediction determiner 208, prediction combiner 210, seasonal component remover 220, time phased-based filter(s) 221, and/or transformer 222 may be included in predictive autoscaler 118, as described above with reference to FIG. 1. Time series database 212 is an example of time series database 124, as described above with reference to FIG. 1.

Monitor 202 may obtain metrics associated with resources 214, such as, but not limited to, operating systems, applications, services executing on one or more of nodes 108A-108N, 112A-112N and/or 114A-114N, hardware and virtual resources maintained by the network-accessible server set (e.g., nodes 108A-108N, 112A-112N and/or 114A-114N, virtual machines, central processor units (CPUs), storage (e.g., storage disks 122), memories, etc.), and/or I/O, network bandwidth, power, etc., associated therewith. Various metrics for such resources may be collected at regular intervals and may be aggregated as a time series 218 and stored in time series database 212. A time series may be determined for each of a plurality of different metrics. However, the embodiments described herein are not so limited. Monitor 202 may collect multiple days or weeks of worth data to obtain the historical behavior of various metrics. The time series for each metric may be stored in time series database 212.

In accordance with an embodiment, one or more times series may be determined for CPU load or usage associated with a particular cluster. It has been observed that predictions for certain metrics (such as CPU load) are more accurate if predictions are generated individually for different compute processes attributing to the CPU load based on system 100 in which the CPUs are utilized. These different processes may exhibit different patterns of usage, and generating a prediction based on the usage as a whole, rather than individually, may result in an inaccurate prediction. In an embodiment in which nodes 108A-108N, 112A-11N, and/or 114A-114N are utilized for a big data analytics cloud platform and data exploration service (e.g., Azure Data Explorer™ published by Microsoft® Corporation of Redmond, WA), predictions may be generated for a first metric corresponding to a CPU process configured to ingest data into a database implemented via system 100 and for a second metric corresponding to a CPU process configured to process queries for the database. After the predictions are generated, the predictions may be combined (e.g., added) to generate a final or combined prediction.

As shown in FIG. 2, a first time series 224 corresponding to a first metric (e.g., CPU load attributed to data ingestion) and a second time series 226 corresponding to a second metric (e.g., CPU load attributed to query processing) are provided to seasonality determiner 204.

Seasonality determiner 204 may be configured to analyze the historical behavior of the metrics (i.e., time series 224 and time series 226) to determine a seasonal pattern (i.e., a seasonality) therein. Transformer 222 of seasonality determiner 204 may be configured to perform a Fast Fourier Transform (FFT), to find dominant periods in the frequency domain, and/or auto correlation to cross check the found periods in the time domain, on time series 224 to detect seasonality therein. If a seasonal pattern is detected, transformer 222 outputs a detected seasonality (or pattern) 232 (which may be represented by its period (i.e., the numbers of bins for the seasonal patterns)). For example, if the bin size is 1 hour and daily seasonality was found, then the output period would be 24). Similarly, transformer 222 may be configured to perform an FFT, to find dominant periods in the frequency domain, and/or auto correlation to cross check the found periods in the time domain, on time series 226 to detect seasonality therein. If a seasonal pattern is detected, transformer 222 outputs a detected second seasonality (or pattern) 234 (which may be represented by its period (i.e., the number of bins for the seasonal patterns)). In the event that more than one period is detected for the same time series (e.g., a daily period and a weekly period), the longest period (e.g., the weekly seasonality) is used to model the data because the longer one multiples the shorter one. When modeling, for example, a weekly seasonal pattern also having a daily seasonality, the entire daily seasonality is contained within the weekly seasonal pattern. First seasonal pattern 232 and second seasonal pattern 234 may be provided to time phased-based filter(s) 221.

Time phased-based filter(s) 221 may be configured to perform a filtering (or smoothing) function on each phase of first seasonal pattern 232 and second seasonal pattern 234 based on data values located at bins of first seasonal pattern 232 and second seasonal pattern 234 in accordance with one or more bin sizes (e.g., hourly, daily, etc.). The filtering function is configured to reduce the noise in the metric, while preserving the seasonal pattern. For example, in an embodiment in which the window size is 3 weeks, each bin may represent a particular hour of a given day. In this case, the number of bins per day would be 24 (1 bin for each hour of the day) or 168 bins for any given week, total of 504 bins for 3 weeks. For instance, with respect to first seasonal pattern 232, assuming it has weekly period (of 168 bins), the filtering function may be configured to, for each bin of first seasonal pattern 232, determine data values located in the bins of the same phase of the period. For example, if each bin represents an hour, the filtering function determines the data values at time 12:00 AM-01:00 AM on each Monday, total of 3 values (as there are 3 instances of this specific phase in a 3 weeks window). For each bin, the filtering function may then determine the median data value for the determined data values for the bin. After all the median data values are determined for each bin, time phased-based filter(s) 221 generates a seasonal component 236 based on the median data values. It is noted that using the median of the values (and not average) ensures that time phased-based filter(s) 221 automatically handles sporadic outliers. For example, if a single bin has an abnormal high/low metric value, it will not influence the median of the values. This is unlike using the average, where even a single strongly abnormal value can significantly deviate the average value.

Similarly, for second seasonal pattern 234 (again assuming it has a weekly period), the filtering function may be configured to, for each bin of second seasonal pattern 234, determine data values located in the bins of the same phase of the period. For each bin, the filtering function may then determine the median data value for the determined data values for the bin. After all the median data values are determined for each bin, time phased-based filter(s) 221 generates a seasonal component 238 based on the median data values. First seasonal component 236 and Second seasonal component 238 may be provided to seasonal component remover 220 and prediction determiner 208.

It is noted that the window sizes utilized by time phased-based filter(s) 221 are purely exemplary and that any window size (e.g., monthly, yearly, etc.) may be utilized to determine seasonality for different time frames (e.g., monthly seasonality, yearly seasonality, etc.).

Seasonal component remover 220 of seasonality determiner 204 may be configured remove seasonal component 236 from time series 224 and remove seasonal component 238 from time series 226. For example, seasonal component remover 220 may subtract seasonal component 236 from time series 224 to generate a de-seasonalized time series 240 and subtract seasonal component 238 from time series 226 to generate a de-seasonalized time series 242. De-seasonalized time series 240 and De-seasonalized time series 242 may be provided to trend determiner 206.

Trend determiner 206 is configured to determine a trend component 228 for de-seasonalized time series 240 and a determine a trend component 230 for de-seasonalized time series 242. In accordance with an embodiment, trend determiner 206 may utilize linear regression-based techniques known in the relevant art(s) to determine trend component 228 and trend component 230. However, it is noted that other techniques may be utilized to determine trend component 228 and trend component 230, including, but not limited to, m-MA (m-Moving Average)-based algorithms, etc. Trend component 228 and trend component 230 may be provided to prediction determiner 208.

For instance, prediction determiner 208 is configured to generate a first prediction 244 (which may be represented as a time series) for the metric corresponding to time series 224 based on first seasonal component 236 and trend component 228 (e.g., by combining (e.g., adding) first seasonal component 236 and trend component 228) and configured to generate a second prediction 246 (which may be represented as a time series) for the metric corresponding to time series 226 based on second seasonal component 238 and trend component 230 (e.g., by combining (e.g., adding) second seasonal component 238 and trend component 230).

Prediction combiner 210 may comprise a combiner 211 and a regression model 213. Combiner 211 is configured to combine first prediction 244 and second prediction 246 to generate a combined prediction 247, which represents a predicted behavior of the first metric corresponding to time series 224 and the second metric corresponding to time series 226 during a future time frame. In an embodiment in which the first metric and second metric correspond to CPU seconds consumed by different CPU processes, the combined prediction only factors in these different CPU processes. However, in actuality, there may be many other processes that the CPU performs (e.g., garbage collection, heap management, index management, etc.). To factor in the CPU consumed by these other processes, regression model 213 may be configured to perform a linear regression to compensate for this gap.

For example, regression model 213 may perform the linear regression in accordance with Equation 1, which is provided below:

$$(a,b) = \text{argmin}_{(a,b)\in \mathbb{R}\times\mathbb{R}} \sum_{t=1}^{T}(R_t - (a \cdot K_t + b))^2 \quad \text{(Equation 1)}$$

where time T is the number of time bins in the time window of time series 224 and 226 (e.g., 504 time bins for 3 weeks divided by 1 hour), K represents combined prediction 247, and where R represents the metric of total (or actual) CPU time. The total CPU metric may be calculated from the CPU performance counters metrics 250 (that are also collected by monitor 202). The total CPU time R (in CPU seconds units) is calculated by Equation 2:

$$R = \frac{P}{100} \cdot X \cdot \frac{Y}{1\ \text{second}} \qquad \text{(Equation 2)}$$

where Y is equal to a given bin size as described above, where P represents the average of the total CPU usage during that bin (in percentage units), where X represents the number of CPU cores of a particular cluster (e.g., a customer cluster) during that bin, and where R represents the total CPU time in that bin (in CPU seconds units). The performance counters 250 may report the actual CPU usage in terms of percentage (e.g., 90% CPU usage). To generate a time series of the actual CPU in seconds, the reported CPU usage is multiplied by the number of CPU/CPU cores (e.g., 16 cores) and by the duration of each bin. In accordance with Equation 1, an optimal set of coefficients a and b are determined, and combined prediction 247 is input to the linear equation of the linear regression. The linear regression is performed from the modeled CPU (containing only the CPU consumed by the ingestion and querying processes) to the actual CPU. It has been observed based on testing over many thousands of clusters that in almost all cases the regression is very accurate. Thus, a forecast of the actual CPU can be generated by multiplying the forecast of the modeled CPU by a scale factor and adding a constant value.

Based on the foregoing techniques, prediction combiner 210 outputs a prediction 248 of the future CPU-time usage, which is represented as a time series. Based on this output, the total number of CPU cores to handle a predicted future CPU load is determined. The total number of CPU cores may be determined in accordance with Equation 3, which is provided below:

$$X_t = (a \cdot K_t + b) \cdot \frac{100}{P} \cdot \frac{1\ \text{second}}{Y} \qquad \text{(Equation 3)}$$

where X represents the total number of CPU cores that the cluster requires to be able to supply $(a \cdot K_t + b)$ CPU time while keeping a particular percentage of CPU utilization at most. In accordance with an embodiment, two time-series are generated. These two time series represent different thresholds in which the predicted metric (e.g., CPU load) should be between. For example, the first time series represents a desired upper threshold in which the metric should be below. If the metric exceeds this threshold, then additional compute resources should be allocated. The second time series represents a desired lower threshold in which the metric should be above. If the metric drops below this threshold, then compute resources can be deallocated (avoiding the customer paying for idle resources). In accordance with an embodiment in which the metric corresponds to CPU load, the first threshold may correspond to a required amount of CPU cores to be within a first average CPU load (e.g., 50%), and the second threshold may correspond to a required amount of CPU cores to be within a second average CPU load (e.g., 25%).

In accordance with an embodiment, prediction combiner 210 may be configured to determine a measure of confidence for prediction 248. If the measure of confidence exceeds a predetermined threshold, then prediction 248 is utilized to allocate or deallocate compute resources accordingly. Otherwise, compute resources are not allocated or deallocated in accordance with prediction 248. For example, a reactive model for allocating compute resources may be utilized instead. In accordance with an embodiment, the measure of confidence may be determined in accordance with a Pearson correlation between the prediction 248 and the actual metric 218. The Pearson correlation is calculated over the training time window, where both the actual metric 218 and prediction 248 are utilized. When calculating the correlation, one may give greater weight to the data that is closer to the present (e.g., the more recent data values of time series 218 and prediction 248. For example, in an embodiment in which the last three weeks of data is utilized, week 3 may be provided a greater weight than week 2, and week 2 may be provided a greater weight than week 1. It is noted that two correlations may be determined. One correlation may be for the forecasting model (containing the combined seasonal and trend components). This correlation is calculated between time series 218 and combined prediction 247 over the training data window (e.g., 3 weeks). The other correlation estimates the accuracy of the linear regression. This correlation is calculated between prediction 248 and the total CPU time 250 provided by the performance counters (e.g., monitor 202). The final confidence is combined from both correlations, by e.g., multiplication with optional weights.

It is noted that while the foregoing disclosure describes that seasonal components 236 and 238 are determined first and then utilized to determine trend components 228 and 230, the embodiments described herein are not so limited. For instance, a first trend component (e.g., trend component 228) may be determined, for example, by analyzing time series 224, and subtracted from time series 224 to generate a detrended time series. A first seasonal component (e.g., seasonal component 236) may be determined by analyzing the detrended time series. Prediction determiner 208 may be configured to determine first prediction 244 based on a combination of the trend component and the first seasonal component, as described above. Similarly, a second trend component (e.g., trend component 230) may be determined, for example, by analyzing time series 226, and subtracted from time series 226 to generate a detrended time series. A second seasonal component (e.g., seasonal component 238) may be determined by analyzing the detrended time series. Prediction determiner 208 may be configured to determine second prediction 246 based on a combination of second trend component and the second seasonal component, as described above.

Figure 3:
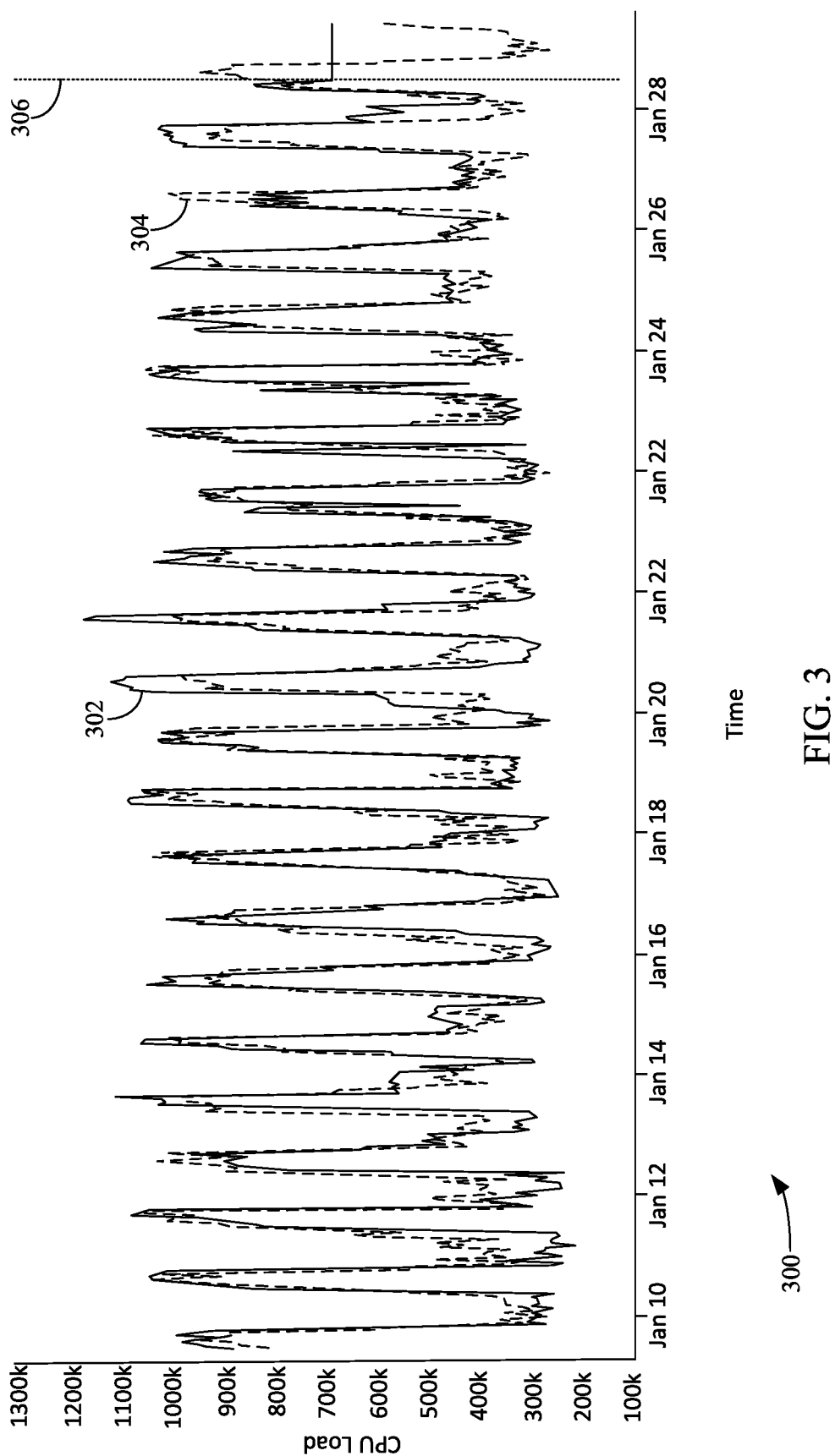
FIG. 3 depicts a graph that shows a historical computing processing unit (CPU) load during a past time frame along with a predicted CPU load during a subsequent, future time frame in accordance with an embodiment.

FIG. 3 depicts a graph 300 that shows a historical CPU load (solid line 302) during a past time frame (the portion of graph 300 to the left of line 306) along with a predicted CPU load (dashed line 304) during a subsequent, future time frame (the portion of graph 300 to the right of line 306) in accordance with an embodiment. Dashed line 304 is an example of prediction 248 generated and outputted by prediction combiner 210, as described above with reference to FIG. 2. As shown in FIG. 3, the actual CPU load is unknown, charted as a flat line of the last known value, in the future time frame. However, the predicted CPU load follows the same historical pattern.

Figure 4:
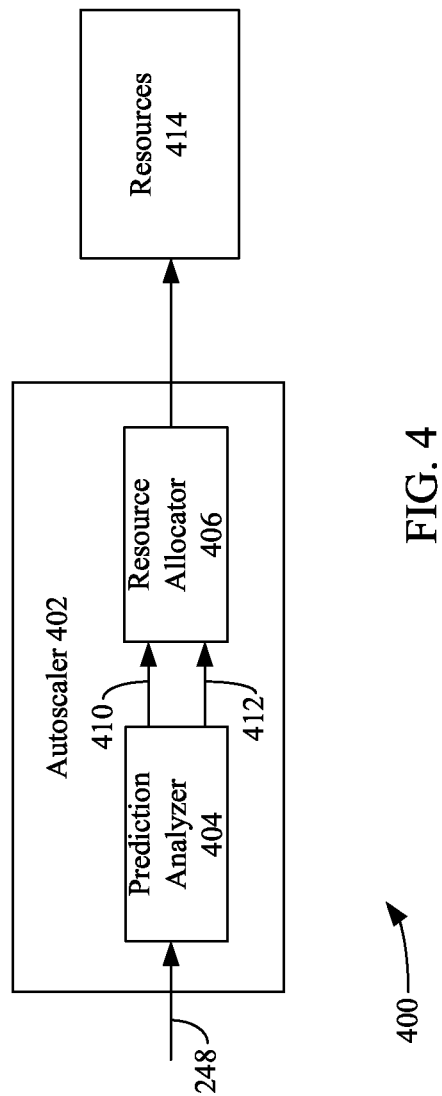
FIG. 4 depicts a block diagram of a system for automatically allocating or deallocating compute resources in accordance with an example embodiment.

Referring again to FIG. 1, predictive autoscaler 118 is configured to utilize prediction 248 to automatically allocate or deallocate computing resources. For example, FIG. 4 depicts a block diagram of a system 400 for automatically allocating or deallocating computing resources in accordance with an example embodiment. As shown in FIG. 4, system 400 comprises an autoscaler 402 and resources 414.

Autoscaler 402 may be included in predictive autoscaler 118, as described above with reference to FIG. 1. Examples of resources 414 include, but are not limited to, operating systems, applications, services executing on one or more of nodes 108A-108N, 112A-112N and/or 114A-114N, hardware and virtual resources maintained by the network-accessible server set (e.g., nodes 108A-108N, 112A-112N and/or 114A-114N, virtual machines, central processor units (CPUs), storage (e.g., storage disks 122), memories, etc.), and/or I/O, network bandwidth, power, etc., associated therewith. Resources 414 are examples of resources 214, as shown in FIG. 2. Autoscaler 402 may comprise a prediction analyzer 404 and a resource allocator 406.

Prediction analyzer 404 may be configured to analyze prediction 248 provided by prediction combiner 210, as described above with reference to FIG. 2. In response to determining that prediction 248 indicates that the metric(s) will decrease in a future time frame, prediction analyzer 404 may provide a deallocation command 410 to resource allocator 406, that causes resource allocator 406 to deallocate (e.g., reduce the number of) one or more resources of resources 414. In response to receiving deallocation command 410, resource allocator 406 may initiate the deallocation of resource(s) of resources 414 at (or before) the predicted time at which the metric(s) will decrease. In accordance with an embodiment in which prediction combiner 210 outputs a lower threshold, predication analyzer 404 determines whether the average metric usage is predicted to be below the lower threshold. In response to determining that the average metric usage is predicted to be below the lower threshold, prediction analyzer 404 determines the number of resources that can be deallocated to increase the metric usage above the lower threshold (while still being below the upper threshold). The number of resources may be determined in accordance with Equation 3 described above. The number of resources may be specified in deallocation command 410.

In response to determining that prediction 248 indicates that the metric(s) will increase in a future time frame, prediction analyzer 404 may provide an allocation command 412 to resource allocator 406, which causes resource allocator 406 to allocate (e.g., increase the number of) resource(s) of resources 414. In response to receiving allocation command 412, resource allocator 406 may initiate the allocation of resource(s) of resources 414 before the predicted time at which the metric(s) will increase. The type of resource(s) of resources 414 that are allocated or deallocated may depend on the metric(s) forecasted by prediction 248. For example, if the metric(s) are indicative of CPU usage, then the type of resource(s) of resources 414 that are allocated or deallocated (based on prediction 248) may be CPUs, CPU cores, virtual machines, etc. In another example, if the metric(s) are indicative of storage-related I/O, then the type of resource(s) of resources 414 that are allocated or deallocated (based on prediction 248) may be storage disks 122 (as described above with reference to FIG. 1). In accordance with an embodiment in which prediction combiner 210 outputs an upper threshold, predication analyzer 404 determines whether the average metric usage is predicted to be above the upper threshold. In response to determining that the average metric usage is predicted to be above the upper threshold, prediction analyzer 404 determines the number of resources to be allocated to decrease the metric usage below the upper threshold. The number of resources may be determined in accordance with Equation 3 described above. The number of resources may be specified in allocation command 412.

In certain situations, the allocation (or setup) of resource(s) of resources 414 may take a relatively long duration of time (e.g., two hours to fill 4 TB SSD disks of a newly allocated VM). During this time, the resource(s) to be allocated are not made available until allocation is complete. In this example, the resource allocation may be initiated approximately two hours before the predicted time at which the metric increase is to occur. This way, the resources will be up and running before the metric increase occurs. This scenario is demonstrated in FIG. 5, which is described below.

Figure 5:
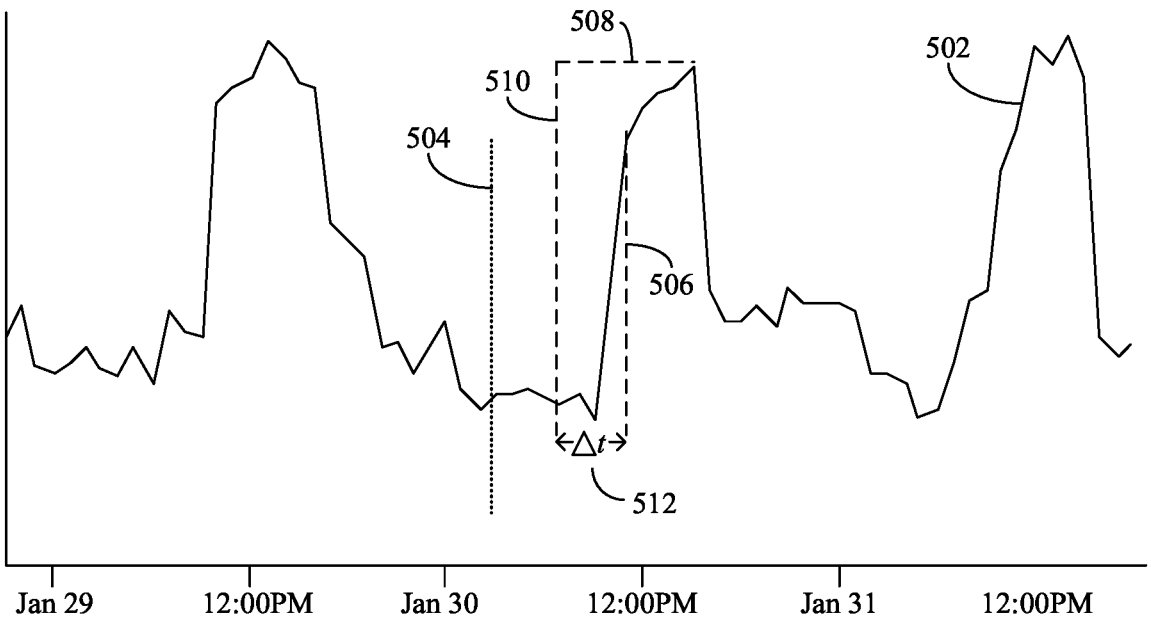
FIG. 5 depicts a graph comprising a prediction of metric behavior in accordance with an embodiment.

FIG. 5 depicts a graph 500 comprising a prediction 502 of metric behavior in accordance with an embodiment. Prediction 502 is an example of prediction 248, as described above with reference to FIG. 2. The portion of graph 500 to the left of line 504 represents an actual CPU load during a past time frame, and the portion of graph 500 to the right of line 504 represents a predicted CPU load for a future time frame. Prediction analyzer 404 analyzes prediction 502 to identify a time in the future time frame at which the CPU load is predicted to increase (or reach a predetermined threshold, e.g., 50% average CPU load). This identified time represented by line 506. Thereafter, prediction analyzer 404 may analyze prediction 502 to identify a time in the future time frame at which the CPU load reaches its maximum. This identified value is represented by line 508. Then, prediction analyzer 404 may send allocation command 412 that causes resource allocator 406 to allocate a number of CPUs or CPU cores that can handle the maximum CPU load. Allocation command 412 also causes resource allocator 406 to initiate the allocation of CPUs/CPU cores an N number of hours before the identified increase of the CPU load (i.e., an N number of hours before the time identified by line 506). The time at which the allocation of the CPUs/CPU cores is initiated is shown via line 510. N represents the duration of time $\Delta t$ 512 (e.g., 2 hours) it takes to allocate the number of CPUs/CPU cores. In accordance with an embodiment, allocation command 412 may specify the time at which the initiation of the allocation of resources should occur, as well as the number of resources to be allocated. The number of resources may be determined in accordance with Equation 3, as described above.

In certain situations, the time in which a metric is decreased before it increases again in the future time frame is less than the time it takes to allocate resources. Accordingly, it would be detrimental to reduce the number of resources for a short duration of time and then subsequently increase the number of resources due to the long setup time for the allocation of resources. In this situation, the resources will not be allocated in time for the subsequent increase of the metric. Accordingly, in accordance with an embodiment, prediction analyzer 404 analyzes prediction 248 for such instances to determine whether a deallocation of resources of resources 414 should occur. This scenario is demonstrated in FIG. 6, which is described below.

Figure 6:
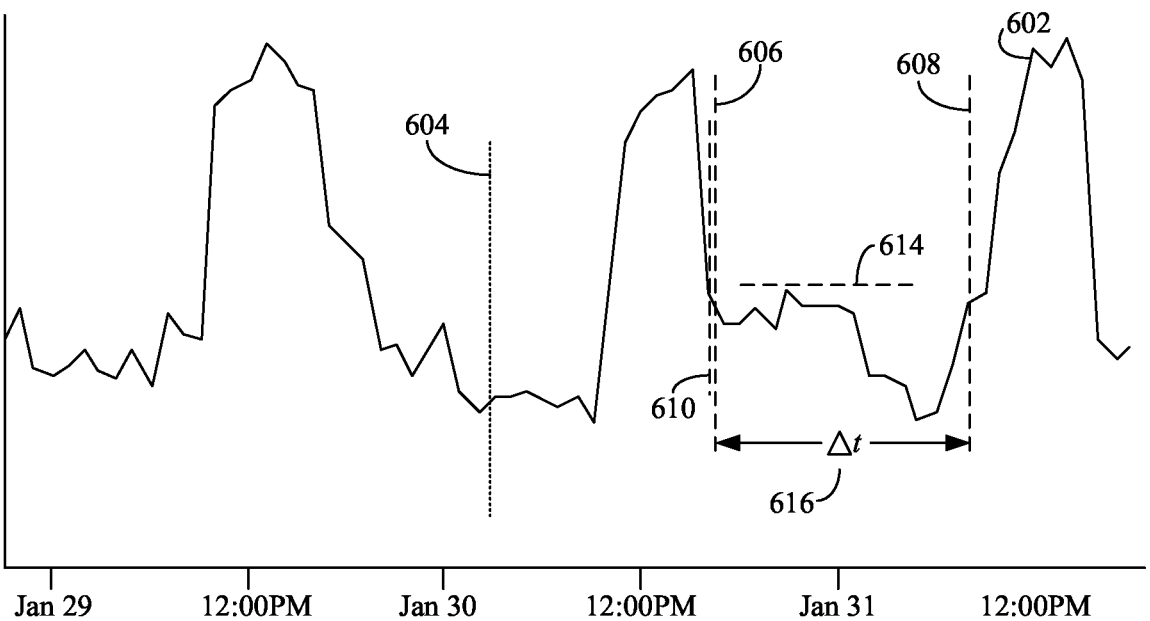
FIG. 6 depicts a graph comprising a prediction of metric behavior in accordance with another embodiment.

FIG. 6 depicts a graph 600 comprising a prediction 602 of metric behavior in accordance with another embodiment. Prediction 602 is an example of prediction 248, as described above with reference to FIG. 2. The portion of graph 600 to the left of line 604 represents an actual CPU load during a past time frame, and the portion of graph 600 to the right of line 604 represents a predicted CPU load for a future time frame. Prediction analyzer 404 analyzes prediction 602 to identify a time in the future time frame at which the CPU load is predicted to decrease and the duration in which the CPU load is decreased. The identified time at which the CPU load is predicted to decrease (or reach a predetermined threshold, e.g., 25% of the average CPU load) is represented by line 606, and an identified time at which the CPU load is predicted to subsequently increase is represented by line 608. Prediction analyzer 404 may analyze prediction 602 to identify a duration of time in which the metric is decreased during the future time frame. Prediction analyzer 404 identifies this duration by comparing the times identified by lines 606 and 608. Time Δt 616 represents the duration of time or gap in which no scale out operation is required.

Prediction analyzer 404 then compares the determined duration to a predetermined threshold that is based on a duration of time to perform the allocation of resource(s) of resources 414 for the increase at time 608 (e.g., 2 hours). If the duration of time is less than the predetermined threshold, then no deallocation of resources of resources 414 is performed. If the duration of time exceeds the predetermined threshold, this means that metric is decreased for a long enough duration that would warrant a deallocation of resources. Thus, prediction analyzer 404 may send deallocation command 410 that causes resource allocator 406 to deallocate a number of CPUs or CPU cores. The deallocation occurs at a time just as the relatively high load ends. The time is shown via line 610. The number of CPUs or CPU cores that are deallocated are based on a maximum CPU load during duration Δt 616. This way, enough CPUs or CPU cores will be allocated to handle the maximum CPU load (identified by line 614) of the subsequent hours. This avoids consecutive deallocation operations by only scheduling a single deallocation operation for duration Δt 616. In accordance with an embodiment, deallocation command 410 may specify the time at which the initiation of the deallocation of resources should occur, as well as the total number of resources that should remain allocated after deallocation. The number of resources may be determined in accordance with Equation 3, as described above.

In accordance with an embodiment, before an initiation of allocation or deallocation occurs, prediction analyzer 404 performs a validation of prediction 248 to determine whether prediction 248 is still accurate. For instance, prediction analyzer 404 may compare either the actual behavior of the metric and compare it to the prediction within a predetermined time period (e.g., since the time the last prediction was generated). If the actual behavior and the prediction in that predetermined time period do not vary by more than a predetermined threshold, the validation passes, and the resources are allocated or deallocated accordingly. If the actual behavior and the prediction in that predetermined time period vary by more than a predetermined threshold, then validation fails, and the resources are not allocated or deallocated. In accordance with an embodiment, a reactive model may be temporarily utilized to allocate or deallocate resources responsive to the validation failing. It is noted that other validation techniques may be utilized in lieu of the techniques described above.

It is noted that while the embodiments described above describe the prediction of metrics associated with a CPU load, the embodiments described herein are not so limited. Additional metrics, in addition to or in lieu of CPU load, such as storage, network I/O, etc., may be utilized when generating a prediction and determining whether resources should be allocated or deallocated. In accordance with an embodiment, a decision to allocate resources may be based on the metric exhibiting the greatest usage. For instance, each resource may be associated with a respective lower threshold and respective upper threshold. Each metric may also be associated with a minimum number of resources time-series (i.e., a minimum resource count) that is required to ensure that the metric usage is below its upper threshold (as calculated via Equation 3). For all metrics that influence a particular resource, the maximum of the minimum resource counts associated with these metrics is determined. The maximum of the minimum resource counts is utilized for allocation purposes. In particular, a particular type of resource is allocated if its resource count is below the maximum of the minimum resource counts time-series associated with the metrics that influence the particular type of the resource.

Each metric may also be associated with a maximum number of resources time-series (i.e., a maximum resource count) that is required to indicate if the metric usage is below its lower threshold. For each metric that influences a particular resource, the maximum of the maximum resource counts associated with the metrics is determined. The maximum of the maximum resource counts is utilized for deallocation purposes. In particular, a particular type of resource is deallocated if its resource count is above the maximum of the maximum resource counts time-series associated with the metrics that influence the particular type of the resource.

Figure 7:
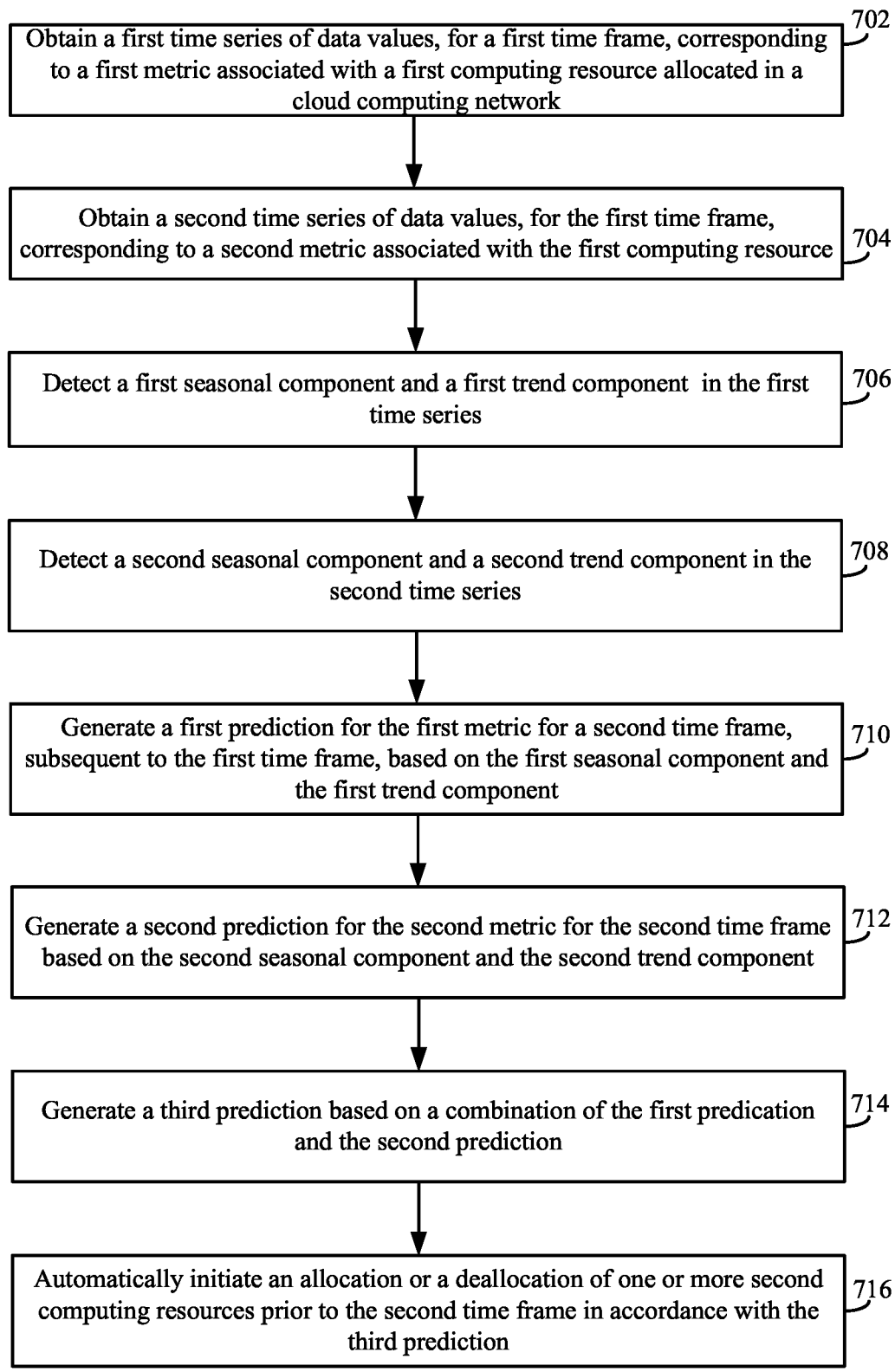
FIG. 7 shows a flowchart of a method for allocating or deallocating resources based on a prediction of metric behavior in accordance with an example embodiment.
Figure 8:
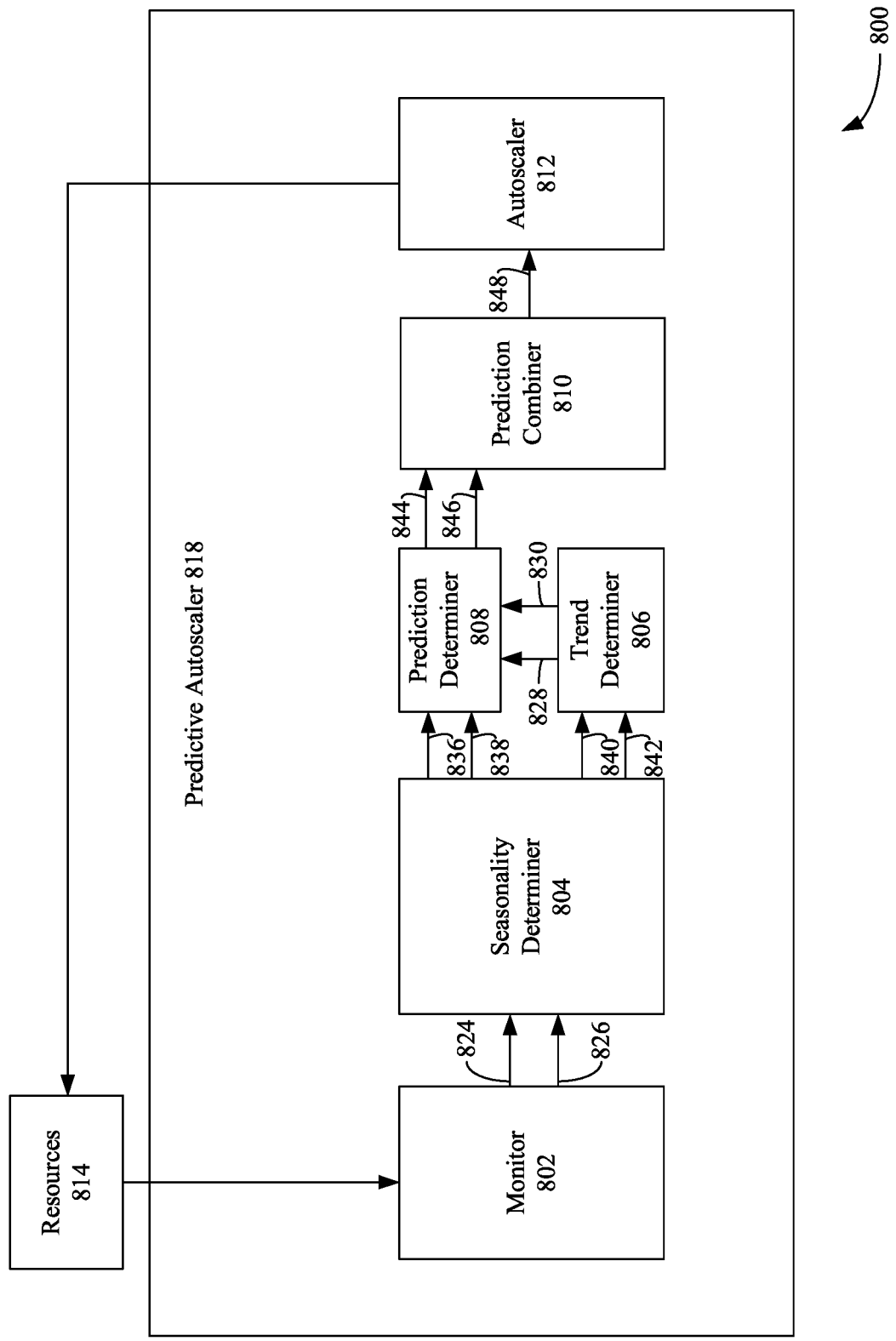
FIG. 8 depicts a block diagram of a system for allocating or deallocating resources based on a prediction of metric behavior in accordance with an example embodiment.

Accordingly, resources may be allocated or deallocated based on a prediction of metric behavior in many ways. For example, FIG. 7 shows a flowchart 700 of a method for allocating or deallocating resources based on a prediction of metric behavior in accordance with an example embodiment. In an embodiment, flowchart 700 may be implemented by system 800. Accordingly, flowchart 700 will be described with reference to FIG. 8. As shown in FIG. 8, system 800 includes a predictive autoscaler 818 and resources 814, which are examples of predictive autoscaler 118 (as shown in FIG. 1) and resources 214 (as shown in FIG. 2.). Predictive autoscaler 818 comprises a monitor 802, a seasonality determiner 804, a trend determiner 806, a prediction determiner 808, a prediction combiner 810, and an autoscaler 812, which are examples of monitor 202, seasonality determiner 204, trend determiner 206, prediction determiner 208, prediction combiner 210, and autoscaler 402, as respectively described above in FIGS. 2 and 4. Other structural and operational embodiments will be apparent to persons skilled in the relevant art(s) based on the discussion regarding flowchart 700 and system 800 of FIG. 8.

Flowchart 700 begins with step 702. In step 702, a first time series of data values is obtained, for a first time frame, corresponding to a first metric associated with a first computing resource allocated in a cloud computing network. For example, with reference to FIG. 8, predictive autoscaler 818 obtains a first time series 824 of data values that is generated via monitor 802. First time series 824 may be stored in and retrieved from storage (e.g., time series database 212, as shown in FIG. 2). First time series 824 comprises historical data values obtained by monitor 802 for a past time frame (e.g., the last 3 weeks of data values). The data values are associated with a first metric associated with a first computing resource of resources 814. First time series 824 is an example of first time series 224, as described above with reference to FIG. 2. First time series 824 is provided to seasonality determiner 804 and trend determiner 806.

In step 704, a second time series of data values is obtained, for the first time frame, corresponding to a second metric associated with the first computing resource. For example, with reference to FIG. 8, predictive autoscaler 818 obtains a second time series 826 of data values that is generated via monitor 802. Second time series 826 may be stored in and retrieved from storage (e.g., time series database 212, as shown in FIG. 2). Second time series 826 comprises historical data values obtained by monitor 802 for a past time frame (e.g., the last 3 weeks of data values). The data values are associated with a second metric associated with the first computing resource of resources 814. Second time series 826 is an example of second time series 226, as described above with reference to FIG. 2. Second time series 826 is provided to seasonality determiner 804 and trend determiner 806.

In accordance with one or more embodiments, the first computing resource comprises a CPU, the first metric comprises CPU usage associated with execution of a first CPU process, and the second metric comprises CPU usage associated with execution of a second CPU process.

In accordance with one or more embodiments, the first CPU process is configured to process queries for a database implemented via the cloud-computing network, and the second CPU process is configured to ingest data into the database.

In step 706, a first seasonal component and a first trend component in the first time series is detected. For example, with reference to FIG. 8, seasonality determiner 804 determines a first seasonal component 236 in first time series 824, and trend determiner 806 determines a first trend component 828 in first time series 824. First seasonal component 836 and first trend component 828 are respective examples of first seasonal component 236 and first trend component 228, as described above with reference to FIG. 2. First seasonal component 836 and first trend component 828 are provided to prediction determiner 808.

In step 708, a second seasonal component and a second trend component in the second time series is detected. For example, with reference to FIG. 8, seasonality determiner 804 determines a second seasonal component 838 in second time series 826, and trend determiner 806 determines a second trend component 830 in second time series 826. Second seasonal component 838 and second trend component 830 are respective examples of second seasonal component 238 and second trend component 230, as described above with reference to FIG. 2. Second seasonal component 838 and second trend component 830 are provided to prediction determiner 808.

In accordance with one or more embodiments, first seasonal component 836 and second seasonal component 838 are determined in accordance with flowchart 900, which is described below with reference to FIG. 9.

In step 710, a first prediction for the first metric is generated for a second time frame, subsequent to the first time frame, based on the first seasonal component and the first trend component. For example, with reference to FIG. 8, prediction determiner 808 generates a first prediction 844 for the first metric for a second, future time frame based on first seasonal component 836 and first trend component 828. First prediction 844 is an example of first prediction 244, as described above with reference to FIG. 2. First prediction 844 is provided to prediction combiner 810.

In step 712, a second prediction for the second metric is generated for the second time frame based on the second seasonal component and second first trend. For example, with reference to FIG. 8, prediction determiner 808 generates a second prediction 846 for the second metric for the second, future time frame based on second seasonal component 838 and second trend component 830. Second prediction 846 is an example of second prediction 246, as described above with reference to FIG. 2. Second prediction 846 is provided to prediction combiner 810.

In accordance with one or more embodiments, the first prediction is generated by combining the first seasonal pattern and the first trend, and the second prediction is generated by combining the second seasonal pattern and the second trend. For example, with reference to FIG. 8, prediction determiner 808 determines first prediction 844 by combining first seasonal pattern 840 with first trend component 828 and determines second prediction 846 by combining second seasonal pattern 842 with second trend component 830.

In step 714, a third prediction is generated based on a combination of the first prediction and the second prediction. For example, with reference to FIG. 8, prediction combiner 810 combines first prediction 844 and second prediction 846 to generate third prediction 848. Third prediction 848 is an example of prediction 248, as described above with reference to FIG. 2. Third prediction 848 is provided to autoscaler 812.

In step 716, an allocation or deallocation of one or more second computing resources is automatically initiated in accordance with the third prediction. For example, with reference to FIG. 8, autoscaler 812 automatically initiates an allocation or a deallocation of second computing resource(s) of resources 814 in accordance with the third prediction.

In accordance with one or more embodiments, the first computing resource is associated with a predetermined threshold (e.g., a lower threshold), and automatically initiating the deallocation of the one or more second computing resources comprises determining that the third prediction indicates that the first metric and the second metric are below the predetermined threshold at a first time during the second time frame, and responsive to determining that the third prediction indicates that the first metric and the second metric are below the predetermined threshold at the first time, automatically initiating the deallocation of the one or more second computing resources at the first time in the second time frame. For example, with reference to FIG. 8, autoscaler 812 determines that prediction 848 indicates that the first metric and the second metric are below the predetermined threshold at a first time during the second time frame and automatically initiates the deallocation of the one or more second computing resources at the first time in the second time frame.

In accordance with one or more embodiments, the first computing resource is associated with a predetermined threshold, and automatically initiating the allocation of the one or more second computing resources comprises determining that the third prediction indicates that at least one of the first metric or the second metric exceeds the predetermined threshold at a first time during the second time frame, and responsive to determining that the third prediction indicates that at least one of the first metric or the second metric exceeds the predetermined threshold at the first time, automatically initiating the allocation of the one or more second computing resources prior to the first time in the second time frame. For example, with reference to FIG. 8, autoscaler 812 determines that prediction 848 indicates that the at least one of the first metric or the second metric exceed the predetermined threshold at a first time during the second time frame and automatically initiates the allocation of the one or more second computing resources prior to the first time in the second time frame.

In a scenario in which a deallocation is to occur, the second computing resources(s) may include one or more of the first computing resources. In a scenario in which an allocation is to occur, the second computing resources(s) comprise computing resources other than first computing resources(s).

Figure 9:
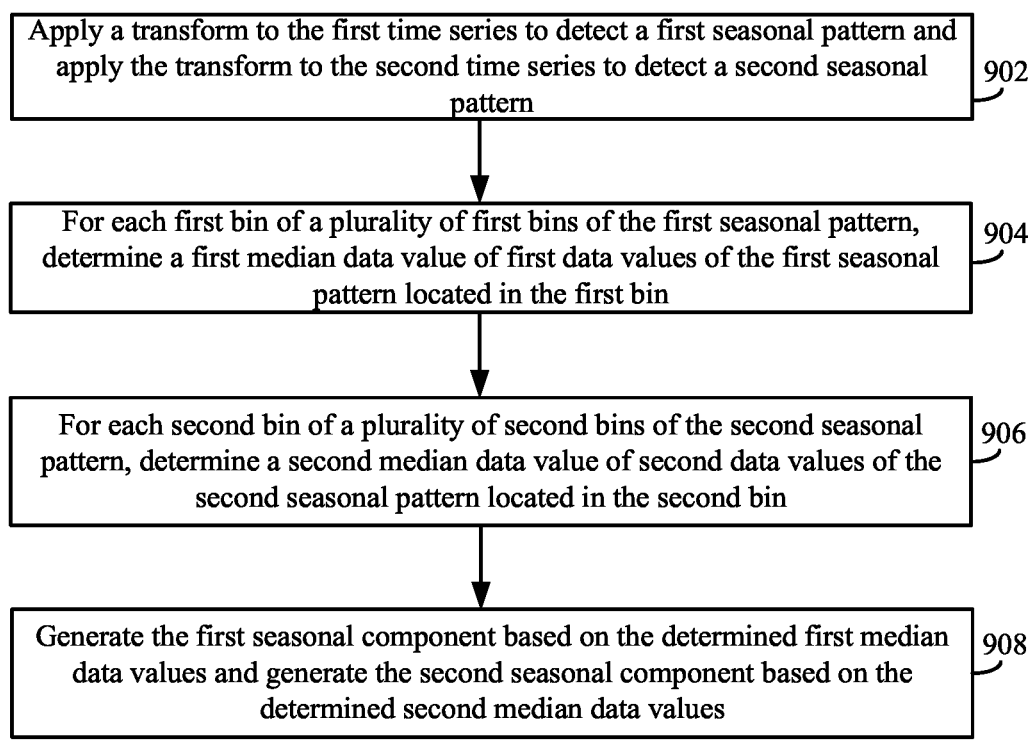
FIG. 9 shows a flowchart of a method for detecting a seasonal pattern in a time series in accordance with an example embodiment.

FIG. 9 shows a flowchart 900 of a method for detecting a seasonal component in a time series in accordance with an example embodiment. In an embodiment, flowchart 900 may be implemented by system 200 of FIG. 2 and system 800 of FIG. 8. Accordingly, flowchart 900 will be described with continued reference to FIGS. 2 and 8. Other structural and operational embodiments will be apparent to persons skilled in the relevant art(s) based on the discussion regarding flowchart 900 and system 200 of FIG. 2 and system 800 of FIG. 8.

Flowchart 900 begins with step 902. In step 902, a transform is applied to the first time series to detect a first seasonal pattern, and the transform is applied to the second time series to detect a second seasonal pattern. For example, with reference to FIG. 8, seasonality determiner 804 applies a transform to first time series 824 to detect a first seasonal pattern and applies the transform to second time series 826 to detect a second seasonal pattern. For instance, with reference to FIG. 2, transformer 222 applies a transform to first time series 224 to detect first seasonal pattern 232 and applies the transform to second time series 226 to detect second seasonal pattern 234.

In step 904, for each first bin of a plurality of first bins of the first seasonal pattern, a first median value of first data values of the first seasonal pattern located in the first bin is determined the plurality of first bins having a same phase of a predetermined period of the first seasonal pattern. For example, with reference to FIG. 8, seasonality determiner 804, for each first bin of a plurality of first bins of first data values of the first seasonal pattern, determines a first median value of the data values located in the first bin. For instance, as shown in FIG. 2, time phased-based filter(s) 221 of seasonality determiner 204, for each first bin of a plurality of first bins of first seasonal pattern 232, determines a first median value of the data values located in the first bin.

In step 906, for each first bin of a plurality of second bins of the second seasonal pattern, a second median value of second data values of the second seasonal pattern located in the second bin is determined, the plurality of second bins having the same phase of the predetermined period of the second seasonal pattern. For example, with reference to FIG. 8, seasonality determiner 804, for each second bin of a plurality of second bins of second data values of the second seasonal pattern, determines a second median value of the data values located in the second bin. For instance, as shown in FIG. 2, time phased-based filter(s) 221 of seasonality determiner 204, for each second bin of a plurality of second bins of second seasonal pattern 234, determines a second median value of the data values located in the first bin.

In step 908, the first seasonal component is generated based on the determined first median data values and the second seasonal component is generated based on the determined second median data values. For example, with reference to FIG. 8, seasonality determiner 804 generates first seasonal component 836 based on the determined first median data values and generates a second seasonal component 838 based on the determined second median data values. For instance, with reference to FIG. 2, time phased-based filter(s) 221 generate first seasonal component 236 based on the determined first median data values and generates second seasonal component 238 based on the determined second median data value.

In accordance with one or more embodiments, the first trend component is detected by removing the detected first seasonal component from the first time series to generate a first de-seasonalized time series and removing the detected second seasonal component from the second time series to generate a second de-seasonalized time series. The first trend component is detected based on the first de-seasonalized time series, and the second trend component is detected based on the second de-seasonalized time series. For example, with reference to FIG. 8, seasonality determiner 804 removes first seasonal component 836 from first time series 824 to generate a first de-seasonalized time series 840 and removes second seasonal component 838 from second time series 826 to generate a second de-seasonalized time series 842. Trend determiner 806 detects first trend component 828 based on first de-seasonalized time series 840 and detects second trend component 830 based on second de-seasonalized time series 842. For instance, as shown in FIG. 2, seasonal component remover 220 of seasonality determiner 204 removes first seasonal component 236 from first time series 224 to generate first de-serialized time series 240 and removes second seasonal component 238 from second time series 226 to generate second de-serialized time series 242. Trend determiner 206 determines first trend component 228 based on first de-seasonalized time series 240 (e.g., by performing a linear regression based on first de-seasonalized time series 240) and determines second trend component 230 based on second de-seasonalized time series 242 (e.g., by performing a linear regression based on second de-seasonalized time series 242).

In accordance with one or more embodiments, the third prediction (as described above in step 716 of FIG. 7) indicates a first time during the second time frame at which both the first metric and the second metric are predicted to be below a first predetermined threshold (e.g., a lower threshold). In accordance with such an embodiment, the second computing resource(s) may be deallocated at a time at which the decrease is predicted. Such techniques are described in accordance with flowchart 1000, which is described below with reference to FIG. 10.

Figure 10:
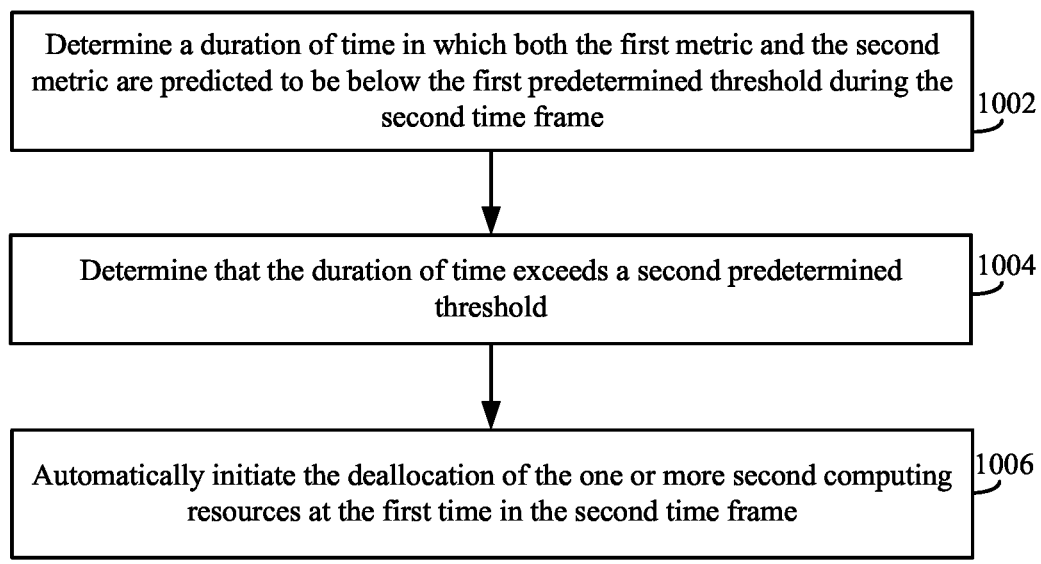
FIG. 10 shows a flowchart of a method for deallocating computing resources in accordance with an example embodiment.

FIG. 10 shows a flowchart 1000 of a method for deallocating computing resources in accordance with an example embodiment. In an embodiment, flowchart 1000 may be implemented by system 400 of FIG. 4 and system 800 of FIG. 8. Accordingly, flowchart 1000 will be described with continued reference to FIGS. 4 and 8. Other structural and operational embodiments will be apparent to persons skilled in the relevant art(s) based on the discussion regarding flowchart 1000 and system 400 of FIG. 4 and system 800 of FIG. 8.

Flowchart 1000 begins with step 1002. In step 1002, a duration of time in which both the first metric and the second metric are predicted to be below a first predetermined threshold during the second time frame is determined. For example, with reference to FIG. 8, autoscaler 812 determines a duration of time in which both the first metric and the second metric are predicted to be below a first predetermined threshold during the second time frame. For instance, with reference to FIG. 4, prediction analyzer 404 analyzes prediction 248 to determine a duration of time in the second, future time frame in which both the first metric and the second metric are predicted to be below the first predetermined threshold. The duration of time is presented as Δt 616 in FIG. 6).

In step 1004, a determination is made that the duration of time in which both the first metric and the second metric are predicted to be below the first predetermined threshold during the second time frame exceeds a second predetermined threshold. For example, with reference to FIG. 8, autoscaler 812 determines that the duration of time time in which both the first metric and the second metric are predicted to be below the first predetermined threshold during the second time frame exceeds a second predetermined threshold. The second predetermined threshold may be based on a duration of time (e.g., 2 hours) required to allocate the one or more second computing resources of resources 814 (e.g., Δt 512 of FIG. 5).

In step 1006, responsive to determining that the duration of time exceeds the predetermined threshold, the deallocation of the one or more second computing resources is automatically initiated prior to (or at) (e.g., line 610 of FIG. 6) the first time in the second time frame (e.g., line 606 of FIG. 6). For example, with reference to FIG. 8, autoscaler 812 automatically initiates the deallocation of the second computing resource(s) of resources 814. For instance, with reference to FIG. 4, prediction analyzer 404 provides deallocation command 410 to resource allocator 406, which causes resource allocator 406 to automatically initiate the deallocation of resources of resource(s) 414. Resource allocator 406 initiates the deallocation prior to (or at) the first time in the second time frame at which both the first metric and the second metric are predicted to be below the first predetermined threshold. The first time is represented by line 606 of FIG. 6, and the time at which the deallocation is initiated is represented by line 610 of FIG. 6.

It is noted that each of the first metric and the second metric may be associated with a respective first predetermined threshold (i.e., a respective lower threshold). In accordance with such an embodiment, a determination is made as to whether both the first metric and the second metric are below their respective first predetermined thresholds.

It is noted that the deallocation is not performed responsive to a determination that the duration of time does not exceed the predetermined threshold.

In accordance with one or more embodiments, the third prediction (as described above in step 716 of FIG. 7) indicates a first time during the second time frame at which at least one of the first metric or the second metric are predicted to exceed a predetermined threshold (e.g., an upper threshold). In accordance with such an embodiment, the second computing resource(s) may be allocated at a time prior to when the increase is predicted.

For example, the allocation of the one or more second computing resources is automatically initiated at a second time (e.g., line 510 of FIG. 5) in the second time frame, the second time being before the first time. The second time may be based on a duration of time it takes to allocate the second computing resource(s) (e.g., Δt 512 of FIG. 5) and the first time. For example, with reference to FIG. 8, autoscaler 812 automatically initiates the allocation of the second computing resource(s) of resources 814 at a second time in the second time frame based on duration of time Δt 512 of FIG. 5 and the first time. For instance, with reference to FIG. 4, prediction analyzer 404 provides allocation command 412 to resource allocator 406, which causes resource allocator 406 to automatically initiate the allocation of resources of resource(s) 414. Resource allocator 406 initiates the allocation at a second time in the second time frame based on duration of time Δt 512 of FIG. 5 and the first time (which indicates a time at which at least one of the first metric or the second metric is increased). The first time is represented by line 506 of FIG. 5. The second time is a time before the first time and may be determined by subtracting duration of time Δt 512 of FIG. 5 from the first time, thus enabling the second computing resource(s) to be allocated (i.e., up and running) by the time the at least one of the first metric or the second metric is increased).

It is noted that each of the first metric and the second metric may be associated with a respective predetermined threshold (i.e., a respective upper threshold). In accordance with such an embodiment, a determination is made as to whether at least one of the first metric or the second metric are above their respective predetermined thresholds.

III. Example Computer System Implementation

The systems and methods described above in reference to FIGS. 1-10, may be implemented in hardware, or hardware combined with one or both of software and/or firmware. For example, system 1100 of FIG. 11 may be used to implement any of nodes 108A-108B, 112A-112N, and/or 114A-114N, computing device 104, and predictive autoscaler 118 of FIG. 1, monitor 202, time series database 212, seasonality determiner 204, trend determiner 206, prediction determiner 208, prediction combiner 210, seasonal component remover 220, time phased-based filter(s) 221, transformer 222, combiner 211, and regression model 213 of FIG. 2, autoscaler 402, prediction analyzer 404, and resource allocator 406 of FIG. 4, and predictive autoscaler 818, monitor 802, trend determiner 806, seasonality determiner 804, prediction determiner 808, prediction combiner 810, and autoscaler 812 of FIG. 8, and/or any of the components respectively described therein, and flowcharts 700, 900, and/or 1000 may be each implemented as computer program code/instructions configured to be executed in one or more processors and stored in a computer readable storage medium. Alternatively, any of nodes 108A-108B, 112A-112N, and/or 114A-114N, computing device 104, and predictive autoscaler 118 of FIG. 1, monitor 202, time series database 212, seasonality determiner 204, trend determiner 206, prediction determiner 208, prediction combiner 210, seasonal component remover 220, time phased-based filter(s) 221, transformer 222, combiner 211, and regression model 213 of FIG. 2, autoscaler 402, prediction analyzer 404, and resource allocator 406 of FIG. 4, and predictive autoscaler 818, monitor 802, trend determiner 806, seasonality determiner 804, prediction determiner 808, prediction combiner 810, and autoscaler 812 of FIG. 8, and/or any of the components respectively described therein and/or any of the components respectively described therein, and flowcharts 700, 900, and/or 1000 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions. The description of system 1100 provided herein is provided for purposes of illustration, and is not intended to be limiting. Embodiments may be implemented in further types of computer systems, as would be known to persons skilled in the relevant art(s).

Figure 11:
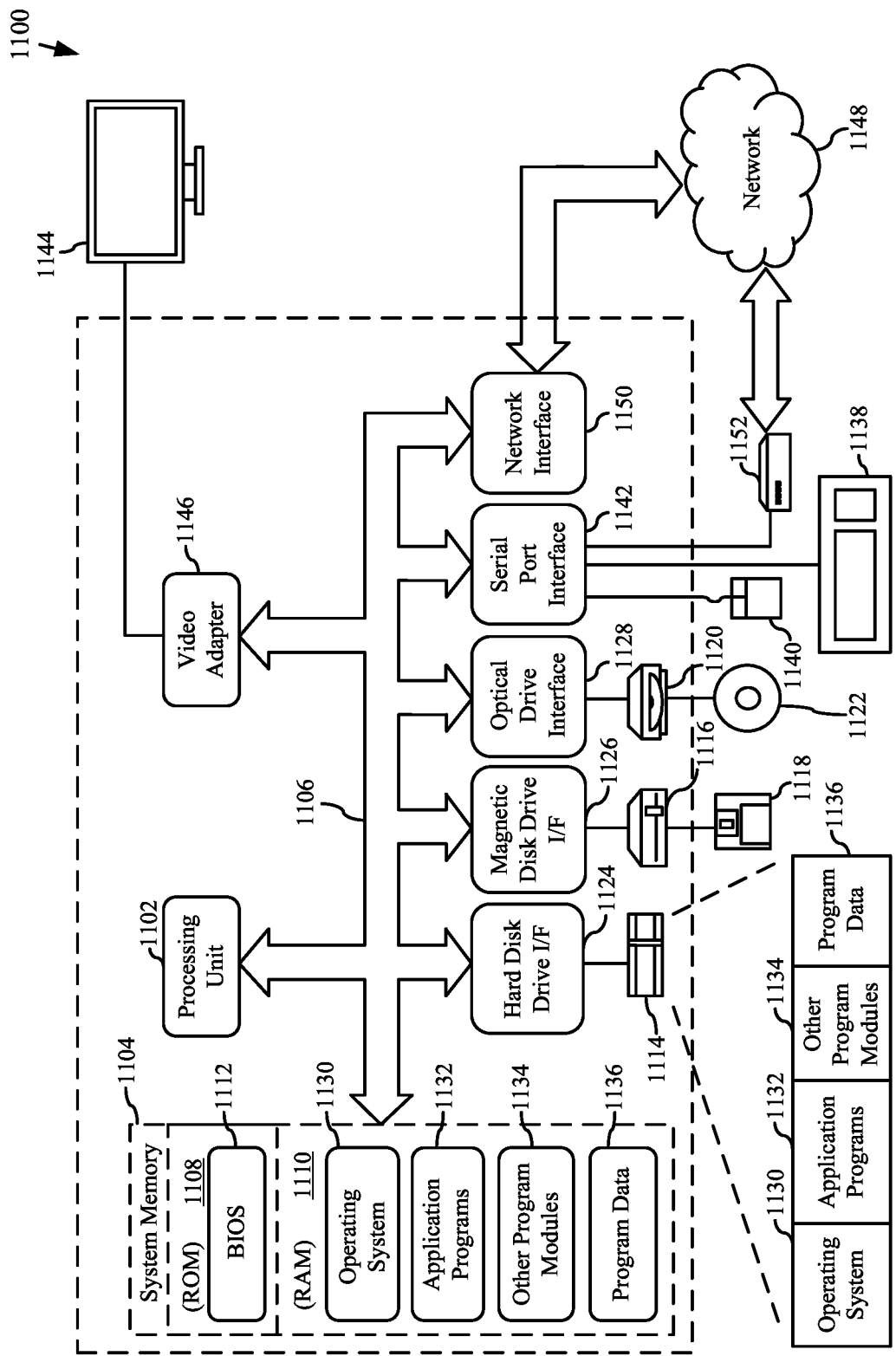
FIG. 11 is a block diagram of an example processor-based computer system that may be used to implement various embodiments.

As shown in FIG. 11, system 1100 includes a processing unit 1102, a system memory 1104, and a bus 1106 that couples various system components including system memory 1104 to processing unit 1102. Processing unit 1102 may comprise one or more circuits, microprocessors or microprocessor cores. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random access memory (RAM) 1110. A basic input/output system 1112 (BIOS) is stored in ROM 1108.

System 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, BLU-RAY™ disk or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as solid state drives, flash memory cards, digital video disks, random access memories (RAMs), read only memories (ROM), and the like.

A number of program modules may be stored on the hard disk, magnetic disk, optical disk, ROM, or RAM. These program modules include an operating system 1130, one or more application programs 1132, other program modules 1134, and program data 1136. In accordance with various embodiments, the program modules may include computer program logic that is executable by processing unit 1102 to perform any or all of the functions and features of any of nodes 108A-108B, 112A-112N, and/or 114A-114N, computing device 104, and predictive autoscaler 118 of FIG. 1, monitor 202, time series database 212, seasonality determiner 204, trend determiner 206, prediction determiner 208, prediction combiner 210, seasonal component remover 220, time phased-based filter(s) 221, transformer 222, combiner 211, and regression model 213 of FIG. 2, autoscaler 402, prediction analyzer 404, and resource allocator 406 of FIG. 4, and predictive autoscaler 818, monitor 802, trend determiner 806, seasonality determiner 804, prediction determiner 808, prediction combiner 810, and autoscaler 812 of FIG. 8, and/or any of the components respectively described therein, as described above. The program modules may also include computer program logic that, when executed by processing unit 1102, causes processing unit 1102 to perform any of the steps of any of the flowcharts of FIGS. 7, 9, and 10, as described above.

A user may enter commands and information into system 1100 through input devices such as a keyboard 1138 and a pointing device 1140 (e.g., a mouse). Other input devices (not shown) may include a microphone, joystick, game controller, scanner, or the like. In one embodiment, a touch screen is provided in conjunction with a display 1144 to allow a user to provide user input via the application of a touch (as by a finger or stylus for example) to one or more points on the touch screen. These and other input devices are often connected to processing unit 1102 through a serial port interface 1142 that is coupled to bus 1106, but may be connected by other interfaces, such as a parallel port, game port, or a universal serial bus (USB). Such interfaces may be wired or wireless interfaces.

Display 1144 is connected to bus 1106 via an interface, such as a video adapter 1146. In addition to display 1144, system 1100 may include other peripheral output devices (not shown) such as speakers and printers.

System 1100 is connected to a network 1148 (e.g., a local area network or wide area network such as the Internet) through a network interface 1150, a modem 1152, or other suitable means for establishing communications over the network. Modem 1152, which may be internal or external, is connected to bus 1106 via serial port interface 1142.

As used herein, the terms "computer program medium," "computer-readable medium," and "computer-readable storage medium" are used to generally refer to memory devices or storage structures such as the hard disk associated with hard disk drive 1114, removable magnetic disk 1118, removable optical disk 1122, as well as other memory devices or storage structures such as flash memory cards, digital video disks, random access memories (RAMs), read only memories (ROM), and the like. Such computer-readable storage media are distinguished from and non-overlapping with communication media (do not include communication media or modulated data signals). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1132 and other program modules 1134) may be stored on the hard disk, magnetic disk, optical disk, ROM, or RAM. Such computer programs may also be received via network interface 1150, serial port interface 1142, or any other interface type. Such computer programs, when executed or loaded by an application, enable system 1100 to implement features of embodiments discussed herein. Accordingly, such computer programs represent controllers of the system 1100.

Embodiments are also directed to computer program products comprising software stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to memory devices and storage structures such as RAM, hard drives, solid state drives, floppy disks, CD ROMs, DVD ROMs, zip disks, tapes, magnetic storage devices, optical storage devices, MEMs, nanotechnology-based storage devices, and the like.

IV. Further Example Embodiments

A method is described herein. The method includes: obtaining a first time series of data values, for a first time frame, corresponding to a first metric associated with a first computing resource allocated in a cloud computing network; obtaining a second time series of data values, for the first time frame, corresponding to a second metric associated with the first computing resource; detecting a first seasonal component and a first trend component in the first time series; detecting a second seasonal component and a second trend component in the second time series; generating a first prediction for the first metric for a second time frame, subsequent to the first time frame, based on the first seasonal component and the first trend component; generating a second prediction for the second metric for the second time frame based on the second seasonal component and the second trend component; generating a third prediction based on a combination of the first prediction and the second prediction; automatically initiating an allocation or a deallocation of one or more second computing resources in accordance with the third prediction.

In one implementation of the foregoing method, the first computing resource comprises a central processing unit (CPU), and the first metric comprises CPU usage associated with execution of a first CPU process and the second metric comprises CPU usage associated with execution of a second CPU process.

In another implementation of the foregoing method, the first CPU process is configured to process queries for a database implemented via the cloud computing network, and the second CPU process is configured to ingest data into the database.

In another implementation of the foregoing method, detecting the first seasonal component and detecting the second seasonal pattern component: applying a transform to the first time series to detect a first seasonal pattern and applying the transform to the second time series to detect a second seasonal pattern; for each first bin of a plurality of first bins of the first seasonal pattern, determining a first median data value of first data values of the first seasonal pattern located in the first bin, the plurality of first bins having a same phase of a predetermined period of the first seasonal pattern; for each second bin of a plurality of second bins of the second seasonal pattern, determining a second median data value of second data values of the second seasonal pattern located in the second bin, the plurality of second bins having the same phase of the predetermined period of the second seasonal pattern; and generating the first seasonal component based on the determined first median data values and generating the second seasonal component based on the determined second median data values.

In another implementation of the foregoing method, detecting the first trend component and the second trend component comprises: removing the detected first seasonal component from the first time series to generate a first de-seasonalized time series and removing the detected second seasonal component from the second time series to generate a second de-seasonalized time series; detecting the first trend component based on the first de-seasonalized time series and detecting the second trend component based on the second de-seasonalized time series.

In another implementation of the foregoing method, generating the first prediction comprises combining the first seasonal component and the first trend component to generate the first prediction, and generating the second prediction comprises combining the second seasonal component and the second trend component to generate the second prediction.

In another implementation of the foregoing method, the third prediction indicates a first time during the second time frame at which both the first metric and the second metric are predicted to be below a first predetermined threshold, and automatically initiating the deallocation of the one or more second computing resources in accordance with the third prediction comprises: determining a duration of time in which both the first metric and the second metric are predicted to be below the first predetermined threshold during the second time frame; determining that the duration of time exceeds a second predetermined threshold; and responsive to determining that the duration of time exceeds the second predetermined threshold, automatically initiating the deallocation of the one or more second computing resources at the first time in the second time frame.

In another implementation of the foregoing method, the third prediction indicates a first time during the second time frame at which at least one of the first metric or the second metric is predicted to exceed a predetermined threshold, the method further comprises: automatically initiating the allocation of the one or more second computing resources at a second time, the second time being before the first time.

A system is also described herein. The system includes: at least one processor circuit; and at least one memory that stores program code configured to be executed by the at least one processor circuit, the program code comprising: a predictive autoscaler configured to obtain a first time series of data values, for a first time frame, corresponding to a first metric associated with a first computing resource allocated in a cloud computing network; obtain a second time series of data values, for the first time frame, corresponding to a second metric associated with the first computing resource; detect a first seasonal component and a first trend component in the first time series; detect a second seasonal component and a second trend component in the second time series; generate a first prediction for the first metric for a second time frame, subsequent to the first time frame, based on the first seasonal component and the first trend component; generate a second prediction for the second metric for the second time frame based on the second seasonal component and the second trend component; generate a third prediction based on a combination of the first prediction and the second prediction; and automatically initiate an allocation or a deallocation of one or more second computing resources in accordance with the third prediction.

In one implementation of the foregoing system, the first computing resource comprises a central processing unit (CPU), and the first metric comprises CPU usage associated with execution of a first CPU process and the second metric comprises CPU usage associated with execution of a second CPU process.

In another implementation of the foregoing system, the first CPU process is configured to process queries for a database implemented via the cloud computing network, and the second CPU process is configured to ingest data into the database.

In another implementation of the foregoing system, the predictive autoscaler is configured to: apply a transform to the first time series to detect a first seasonal pattern and apply the transform to the second time series to detect a second seasonal pattern; for each first bin of a plurality of first bins of the first seasonal pattern, determine a first median data value of first data values of the first seasonal pattern located in the first bin, the plurality of first bins having a same phase of a predetermined period of the first seasonal pattern; for each second bin of a plurality of second bins of the second seasonal pattern, determine a second median data value of second data values of the second seasonal pattern located in the second bin, the plurality of second bins having the same phase of the predetermined period of the second seasonal pattern; and generate the first seasonal component based on the determined first median data values and generate the second seasonal component based on the determined second median data values.

In another implementation of the foregoing system, the predictive autoscaler is further configured to: remove the detected first seasonal component from the first time series to generate a first de-seasonalized time series and remove the detected second seasonal component from the second time series to generate a second de-seasonalized time series; detect the first trend component based on the first de-seasonalized time series and detect the second trend component based on the second de-seasonalized time series.

In another implementation of the foregoing system, the predictive autoscaler is configured to combine the first seasonal component and the first trend component to generate the first prediction, and wherein the predictive autoscaler is configured to combine the second seasonal component and the second trend component to generate the second prediction.

In another implementation of the foregoing system, the third prediction indicates a first time during the second time frame at which both the first metric and the second metric are predicted to be below a first predetermined threshold, and wherein the predictive autoscaler is configured to: determine a duration of time in which both the first metric and the second metric are predicted to be below the first predetermined threshold during the second time frame; determine that the duration of time exceeds a second predetermined threshold; and responsive to determining that the duration of time exceeds the second predetermined threshold, automatically initiate the deallocation of the one or more second computing resources at the first time in the second time frame.

In another implementation of the foregoing system, the third prediction indicates a first time during the second time frame at which at least one of the first metric or the second metric is predicted to exceed a predetermined threshold, and the predictive autoscaler is further configured to: automatically initiate the allocation of the one or more second computing resources at a second time in the second time frame, the second time being before the first time.

A computer-readable storage medium having program instructions recorded thereon that, when executed by at least one processor, perform a method. The method includes: obtaining a first time series of data values, for a first time frame, corresponding to a first metric associated with a first computing resource allocated in a cloud computing network; obtaining a second time series of data values, for the first time frame, corresponding to a second metric associated with the first computing resource; detecting a first seasonal component and a first trend component in the first time series; detecting a second seasonal component and a second trend component in the second time series; generating a first prediction for the first metric for a second time frame, subsequent to the first time frame, based on the first seasonal component and the first trend component; generating a second prediction for the second metric for the second time frame based on the second seasonal component and the second trend component; generating a third prediction based on a combination of the first prediction and the second prediction; automatically initiating an allocation or a deallocation of one or more second computing resources prior to the second time frame in accordance with the third prediction.

In another implementation of the foregoing computer-readable storage medium, the first computing resource comprises a central processing unit (CPU), and the first metric comprises CPU usage associated with execution of a first CPU process and the second metric comprises CPU usage associated with execution of a second CPU process.

In another implementation of the foregoing computer-readable storage medium, the first CPU process is configured to process queries for a database implemented via cloud computing network, and the second CPU process is configured to ingest data into the database.

In another implementation of the foregoing computer-readable storage medium, the first CPU process is configured to process queries for a database implemented via the cloud computing network, and the second CPU process is configured to ingest data into the database.

In another implementation of the foregoing computer-readable storage medium, detecting the first seasonal component and detecting the second seasonal pattern component comprises: applying a transform to the first time series to detect a first seasonal pattern and applying the transform to the second time series to detect a second seasonal pattern; for each first bin of a plurality of first bins of the first seasonal pattern, determining a first median data value of first data values of the first seasonal pattern located in the first bin, the plurality of first bins having a same phase of a predetermined period of the first seasonal pattern; for each second bin of a plurality of second bins of the second seasonal pattern, determining a second median data value of second data values of the second seasonal pattern located in the second bin, the plurality of second bins having the same phase of the predetermined period of the second seasonal pattern; and generating the first seasonal component based on the determined first median data values and generating the second seasonal component based on the determined second median data values.

In another implementation of the foregoing computer-readable storage medium, the first computing resources is associated with a predetermined threshold, and automatically initiating the deallocation of the one or more second computing resources comprises: determining that the third prediction indicates that the first metric and the second metric are below the predetermined threshold at a first time during the second time frame; and responsive to determining that the third prediction indicates that the first metric and the second metric are below the predetermined threshold at the first time, automatically initiating the deallocation of the one or more second computing resources at the first time in the second time frame.

In another implementation of the foregoing computer-readable storage medium, the first computing resources is associated with a predetermined threshold, and automatically initiating the allocation of the one or more second computing resources comprises: determining that the third prediction indicates that at least one of the first metric or the second metric exceeds the predetermined threshold at a first time during the second time frame; and responsive to determining that the third prediction indicates that at least one of the first metric or the second metric exceeds the predetermined threshold at the first time, automatically initiating the allocation of the one or more second computing resources prior to the first time in the second time frame.

V. Conclusion

While various example embodiments have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosure should not be limited by any of the above-described example embodiments, but should be defined only in accordance with the following claims and their equivalents.

What is claimed is:
1. A system comprising:
at least one processor circuit; and
at least one memory that stores program code that, when executed by the at least one processor circuit, causes the system to perform operations comprising:

obtaining a first time series of data values, for a first time frame, corresponding to a first metric associated with a first type of process performed by a central processing unit (CPU);

obtaining a second time series of data values, for the first time frame, corresponding to a second metric associated with a second type of process performed by the CPU;

detecting a first seasonal time period and a first trend of the first time series of data values that occurs in the first seasonal time period; detecting a second seasonal time period and a second trend of the second time series of data values that occurs in the second seasonal time period;

generating a first prediction for the first metric for a second time frame, subsequent to the first time frame, based on the first seasonal time period and the first trend;

generating a second prediction for the second metric for the second time frame based on the second seasonal time period and the second trend;

determining that at least one other type of process is performed by the CPU;

performing, using a linear regression model, a linear regression using a combination of the first prediction and the second prediction to compensate for the at least one other type of process performed by the first CPU, wherein the linear regression calculates a third prediction related to usage of the first CPU for the second time frame; and automatically initiating allocation or deallocation of a CPU core based on the third prediction.

2. The system of claim 1, wherein:

the first type of process is configured to process queries for a database implemented via a cloud computing network;

the second type of process is configured to ingest data into the database; and the at least one other type of process performed by the first CPU is configured to collect garbage, manage heaps, or manage indexes.

3. The system of claim 1, wherein the operations further comprise:

applying a transform to the first time series to detect a first seasonal pattern;

applying the transform to the second time series to detect a second seasonal pattern;

for each first bin of a plurality of first bins of the first seasonal pattern, determining a first median data value of the first seasonal pattern located in the first bin, the plurality of first bins having a same phase of a predetermined period of the first seasonal pattern;

for each second bin of a plurality of second bins of the other seasonal pattern, determining a second median data value of the second seasonal pattern located in the second bin, the plurality of second bins having the same phase of the predetermined period of the second seasonal pattern;

generating the first seasonal time period based on the first median data value; and generating the second seasonal time period based on the second median data value.

4. The system of claim 3, wherein the operations further comprise:

removing the first seasonal time period from the first time series of data values to generate a first de-seasonalized time series;

removing the second seasonal time period from the second time series to generate a second de-seasonalized time series;

detecting the first trend based on the first de-seasonalized time series; and detecting the second trend based on the second de-seasonalized time series.

5. The system of claim 1, wherein:

the first prediction indicates a first time during the second time frame at which both the first metric and the second metric are predicted to be below a first predetermined time threshold; and the operations further comprise:

determining a duration of time in which both the first metric and the second metric are predicted to be below the first predetermined threshold during the second time frame;

determining that the duration of time exceeds a second predetermined time threshold; and responsive to determining that the duration of time exceeds the second predetermined time threshold, automatically initiating the deallocation of the CPU core at the time in the second time frame.

6. The system of claim 1, wherein:

the first prediction indicates a first time during the second time frame at which at least one of the first metric or the second metric is predicted to exceed a predetermined time threshold; and the operations further comprise automatically initiating the allocation of the CPU core at a second time that is before the first time based on the first prediction indicating the first time during the second time frame at which the at least one of the first metric or the second metric is predicted to exceed the predetermined time threshold.

7. A method configured to automatically allocate or deallocate computing resources, comprising:

obtaining a first time series of data values, for a first time frame, corresponding to a first metric associated with a first type of process performed by a central processing unit (CPU);

obtaining a second time series of data values, for the first time frame, corresponding to a second metric associated with a second type of process performed by the CPU;

detecting a first seasonal time period and a first trend of the first time series of data values that occurs in the first seasonal time period;

detecting a second seasonal time period and a second trend of the second time series of data values that occurs in the second seasonal time period;

generating a first prediction for the first metric for a second time frame, subsequent to the first time frame, based on the first seasonal time period and the first trend;

generating a second prediction for the second metric for the second time frame based on the second seasonal time period and the second trend;

determining that at least one other type of process is performed by the CPU;

performing, using a linear regression model, a linear regression using a combination of the first prediction and the second prediction to compensate for the at least one other type of process performed by the first CPU, wherein the linear regression calculates a third prediction related to usage of the first CPU for the second time frame; and automatically initiating an allocation or a deallocation of a CPU core based on the third prediction.

8. The method of claim 7, wherein:
the first type of process is configured to process queries for a database implemented via a cloud computing network;
the second type of process is configured to ingest data into the database; and
the at least one other type of process performed by the first CPU is configured to collect garbage, manage heaps, or manage indexes.

9. The method of claim 7, further comprising:
applying a transform to the first time series to detect a first seasonal pattern;
applying the transform to the second time series to detect a second seasonal pattern;
for each first bin of a plurality of first bins of the first seasonal pattern, determining a first median data value of the first seasonal pattern located in the first bin, the plurality of first bins having a same phase of a predetermined period of the first seasonal pattern;
for each second bin of a plurality of second bins of the other seasonal pattern, determining a second median data value of the second seasonal pattern located in the second bin, the plurality of second bins having the same phase of the predetermined period of the second seasonal pattern;
generating the first seasonal time period based on the first median data value; and
generating the second seasonal time period based on the second median data value.

10. The method of claim 9, further comprising:
removing the first seasonal time period from the first time series of data values to generate a first de-seasonalized time series;
removing the second seasonal time period from the second time series to generate a second de-seasonalized time series;
detecting the first trend based on the first de-seasonalized time series; and
detecting the second trend based on the second de-seasonalized time series.

11. The method of claim 7, wherein:
the first prediction indicates a first time during the second time frame at which both the first metric and the second metric are predicted to be below a first predetermined time threshold; and
the operations further comprise:
determining a duration of time in which both the first metric and the second metric are predicted to be below the first predetermined threshold during the second time frame;
determining that the duration of time exceeds a second predetermined time threshold; and
responsive to determining that the duration of time exceeds the second predetermined time threshold, automatically initiating the deallocation of the CPU core at the time in the second time frame.

12. The method of claim 7, wherein:
the first prediction indicates a first time during the second time frame at which at least one of the first metric or the second metric is predicted to exceed a predetermined time threshold; and
the operations further comprise automatically initiating the allocation of the CPU core at a second time that is before the first time based on the first prediction indicating the first time during the second time frame at which the at least one of the first metric or the second metric is predicted to exceed the predetermined time threshold.

13. A computer-readable storage medium having program instructions recorded thereon that, when executed by a processor circuit, causes a system to perform operations comprising:
obtaining a first time series of data values, for a first time frame, corresponding to a first metric associated with a first type of process performed by a central processing unit (CPU);
obtaining a second time series of data values, for the first time frame, corresponding to a second metric associated with a second type of process performed by the CPU;
detecting a first seasonal time period and a first trend of the first time series of data values that occurs in the first seasonal time period;
detecting a second seasonal time period and a second trend of the second time series of data values that occurs in the second seasonal time period;
generating a first prediction for the first metric for a second time frame, subsequent to the first time frame, based on the first seasonal time period and the first trend;
generating a second prediction for the second metric for the second time frame based on the second seasonal time period and the second trend;
determining that at least one other type of process is performed by the CPU;
performing, using a linear regression model, a linear regression using a combination of the first prediction and the second prediction to compensate for the at least one other type of process performed by the first CPU, wherein the linear regression calculates a third prediction related to usage of the first CPU for the second time frame; and
automatically initiating an allocation or a deallocation of a CPU core based on the third prediction.

14. The computer-readable storage medium of claim 13, wherein:
the first type of process is configured to process queries for a database implemented via a cloud computing network;
the second type of process is configured to ingest data into the database; and
the at least one other type of process performed by the first CPU is configured to collect garbage, manage heaps, or manage indexes.

15. The computer-readable storage medium of claim 13, wherein the operations further comprise:
applying a transform to the first time series to detect a first seasonal pattern;
applying the transform to the second time series to detect a second seasonal pattern;
for each first bin of a plurality of first bins of the first seasonal pattern, determining a first median data value of the first seasonal pattern located in the first bin, the plurality of first bins having a same phase of a predetermined period of the first seasonal pattern;
for each second bin of a plurality of second bins of the other seasonal pattern, determining a second median data value of the second seasonal pattern located in the second bin, the plurality of second bins having the same phase of the predetermined period of the second seasonal pattern;

generating the first seasonal time period based on the first median data value; and generating the second seasonal time period based on the second median data value.

16. The computer-readable storage medium of claim 15, wherein the operations further comprise:

removing the first seasonal time period from the first time series of data values to generate a first de-seasonalized time series;

removing the second seasonal time period from the second time series to generate a second de-seasonalized time series;

detecting the first trend based on the first de-seasonalized time series; and detecting the second trend based on the second de-seasonalized time series.

* * * * *